United States Patent
Matsumoto

(10) Patent No.: US 12,400,170 B2
(45) Date of Patent: Aug. 26, 2025

(54) DELIVERY CONTROL DEVICE, DELIVERY CONTROL SYSTEM, AND DELIVERY CONTROL METHOD

(71) Applicant: RAKUTEN GROUP, INC., Tokyo (JP)

(72) Inventor: Asaki Matsumoto, Tokyo (JP)

(73) Assignee: RAKUTEN GROUP, INC., Tokyo (JP)

(*) Notice: Subject to any disclaimer, the term of this patent is extended or adjusted under 35 U.S.C. 154(b) by 0 days.

(21) Appl. No.: 18/410,213

(22) Filed: Jan. 11, 2024

(65) Prior Publication Data

US 2024/0354688 A1 Oct. 24, 2024

(30) Foreign Application Priority Data

Jan. 30, 2023 (JP) .................. 2023-011918

(51) Int. Cl.
*G06Q 10/083* (2024.01)
*B65G 67/00* (2006.01)

(52) U.S. Cl.
CPC ........... *G06Q 10/083* (2013.01); *B65G 67/00* (2013.01)

(58) Field of Classification Search
CPC .............................. G06Q 10/083; B65G 67/00
See application file for complete search history.

(56) References Cited

U.S. PATENT DOCUMENTS

| | | | | |
|---|---|---|---|---|
| 2014/0279277 A1* | 9/2014 | Pei | ..................... | G06Q 30/0635 705/26.81 |
| 2018/0197137 A1* | 7/2018 | High | ................... | G06Q 30/0641 |
| 2020/0288895 A1* | 9/2020 | Bennet | ................... | G06Q 10/08 |
| 2021/0241224 A1* | 8/2021 | Taniguchi | .............. | G06Q 50/40 |
| 2022/0067616 A1* | 3/2022 | Villa | ................... | G06Q 30/0284 |
| 2022/0366364 A1* | 11/2022 | Otsuki | ............... | G06Q 10/0833 |

FOREIGN PATENT DOCUMENTS

JP 2017-58937 A 3/2017

OTHER PUBLICATIONS

G. Attenni, V. Arrigoni, N. Bartolini and G. Maselli, "Drone-Based Delivery Systems: A Survey on Route Planning," in IEEE Access, vol. 11, pp. 123476-123504, 2023, doi: 10.1109/ACCESS.2023.3329195. (Year: 2023).*

* cited by examiner

*Primary Examiner* — Resha Desai
*Assistant Examiner* — Danielle Elizabeth Zevitz
(74) *Attorney, Agent, or Firm* — Sughrue Mion, PLLC

(57) ABSTRACT

A center server manages first position information of a first delivery source where an article to be delivered is handled and an unmanned vehicle is deployed, and second position information of a second delivery source where the article is handled and no unmanned vehicle is deployed, and acquires attribute information of an article which is designated as a delivery target by a user and third position information of a delivery destination of the article. The center server selects, on the basis of attribute information of the article, a delivery method of a first delivery method for delivering the article handled at the first delivery source to the delivery destination by the unmanned vehicle or a second delivery method for delivering the article handled at the second delivery source to the delivery destination by an unmanned vehicle deployed at a base located at a place different from the second delivery source.

16 Claims, 11 Drawing Sheets

FIG. 6

| | REQUIRED TIME T1 FROM UAV BASE | REQUIRED TIME T2 TO DELIVERY DESTINATION | TOTAL TIME T3 OF T1 AND T2 |
|---|---|---|---|
| DELIVERY SOURCE A (UAV DEPLOYED) | — | 20 MINUTES | — |
| DELIVERY SOURCE B (NO UAV DEPLOYED) | 10 MINUTES | 12 MINUTES | 22 MINUTES |
| DELIVERY SOURCE C (NO UAV DEPLOYED) | 12 MINUTES | 8 MINUTES | 20 MINUTES |

FIG. 7

| | REQUIRED TIME T2 TO DELIVERY DESTINATION | HELD WEIGHT UPPER LIMIT VALUE W TO DELIVERY DESTINATION |
|---|---|---|
| DELIVERY SOURCE A (UAV DEPLOYED) | 20 MINUTES | 5.0kg |
| DELIVERY SOURCE B (NO UAV DEPLOYED) | 12 MINUTES | 5.7kg |
| DELIVERY SOURCE C (NO UAV DEPLOYED) | 8 MINUTES | 6.0kg |

FIG. 9
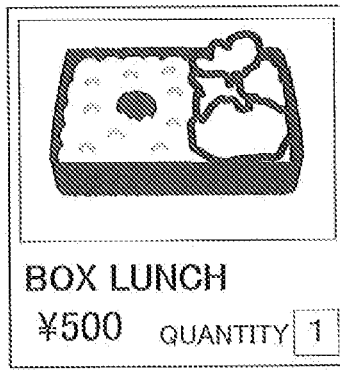
STORE XYZ (UAV DEPLOYED) — BOX LUNCH ¥500 QUANTITY 1 — 511
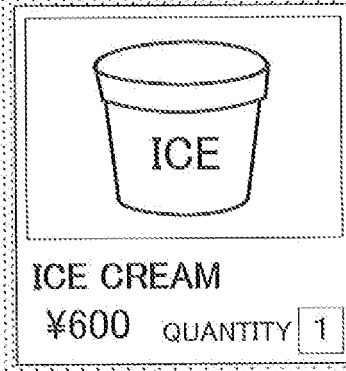
STORE XYZ (UAV DEPLOYED) — ICE CREAM ¥600 QUANTITY 1 — 512
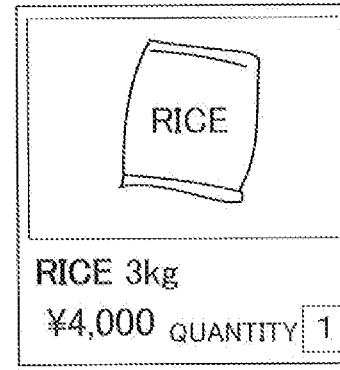
STORE ABC (UAV DEPLOYED) — RICE 3kg ¥4,000 QUANTITY 1 — 513
SELECTION CONFIRMATION — 514

DELIVERY CONTROL DEVICE, DELIVERY CONTROL SYSTEM, AND DELIVERY CONTROL METHOD

CROSS REFERENCE TO RELATED APPLICATION

This application claims priority from Japanese Patent Application No. 2023-011918 which was filed on Jan. 30, 2023, the disclosure of which is herein incorporated by reference in its entirety.

TECHNICAL FIELD

One or more embodiments of the present invention relates to a technical field of a system or the like for delivering an article from a delivery source to a delivery destination by an unmanned vehicle.

RELATED ART

Conventionally, systems for delivering articles such as items from a delivery source to a delivery destination using unmanned vehicles such as unmanned aerial vehicles and unmanned ground vehicles (unmanned traveling vehicles) have been put to practical use. For example, in a system disclosed in JP 2017-58937 A, it is proposed that, when an order for an item to be handled at a certain store (management center) is received, a flying delivery machine deployed at the store is caused to hold a delivery article to deliver the delivery article to a delivery destination.

By the way, from the viewpoint of delivery efficiency such as delivery time and energy consumption, it is desirable to directly deliver an article from a store or the like in a case where the article is handled at the store or the like where an unmanned vehicle is deployed. However, it may be difficult to perform an appropriate delivery depending on attribute information of the article in a case where a delivery time in a state where the article is held by an unmanned vehicle is long. For example, there is an issue that when an article handled at a store or the like where an unmanned vehicle is deployed can be directly delivered from the store or the like, the quality of the article may deteriorate while the article is being delivered in a state of being held for a long time. Moreover, there is an issue that the battery consumption amount of the unmanned vehicle increases as the weight of the article increases due to the delivery of the article in a state of holding the article for a long time.

Therefore, one or more embodiments of the present invention are to providing a delivery control device, a delivery control system, and a delivery control method which can control whether to select a delivery method that places importance on the delivery efficiency of the article or to select a delivery method that places importance on attribute information of the article, and can implement a delivery that is more desirable for the user.

SUMMARY (An aspect 1) In response to the above issue, a delivery control device includes: at least one memory configured to store program code; and at least one processor configured to access the program code and operate as instructed by the program code. The program code includes: management code configured to cause the at least one processor to manage first position information of a first delivery source where an article to be delivered is handled and an unmanned vehicle is deployed, and second position information of a second delivery source where the article is handled and no unmanned vehicle is deployed; acquisition code configured to cause the at least one processor to acquire attribute information of an article which is designated as a delivery target by a user and third position information of a delivery destination of the article among the articles handled respectively at the first delivery source and the second delivery source; and
    selection code configured to cause the at least one processor to select, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source.

(An aspect 2) A delivery control system includes: at least one memory configured to store program code; and at least one processor configured to access the program code and operate as instructed by the program code. The program code includes: management code configured to cause the at least one processor to manage first position information of a first delivery source where an article to be delivered is handled and an unmanned vehicle is deployed, and second position information of a second delivery source where the article is handled and no unmanned vehicle is deployed; acquisition code configured to cause the at least one processor to acquire attribute information of an article which is designated as a delivery target by a user and third position information of a delivery destination of the article among the articles handled respectively at the first delivery source and the second delivery source; and
    selection code configured to cause the at least one processor to select, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source.

(An aspect 3) A delivery control method executed by one or more computers, includes: managing first position information of a first delivery source where an article to be delivered is handled and an unmanned vehicle is deployed, and second position information of a second delivery source where the article is handled and no unmanned vehicle is deployed; acquiring attribute information of an article which is designated as a delivery target by a user and third position information of a delivery destination of the article among the articles handled respectively at the first delivery source and the second delivery source; and selecting, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source.

BRIEF DESCRIPTION OF THE DRAWINGS

FIG. 6 is a diagram illustrating an example of a required time T1 for the UAV 1 to move from the UAV base to each delivery source, a required time T2 for the UAV 1 to move from each delivery source to the delivery destination, and a total time T3 of T1 and T2.

FIG. 7 is a diagram illustrating an example of a held weight upper limit value of the UAV 1 from each delivery source to the delivery destination.

FIG. 9 is a diagram illustrating an example of a screen of an article & delivery source list displayed on a user terminal 3.

DETAILED DESCRIPTION

Hereinafter, one embodiment of the present invention will be described with reference to the drawings. The embodiment to be described below is an embodiment in which the present invention is applied to a system for delivering an article from a delivery source to a delivery destination by an unmanned vehicle. Incidentally, in the present embodiment, a UAV (Unmanned Aerial Vehicle) will be described as an example of an unmanned vehicle.

[1. Configuration and Operation Overview of Delivery Control System S]

Figure 1:
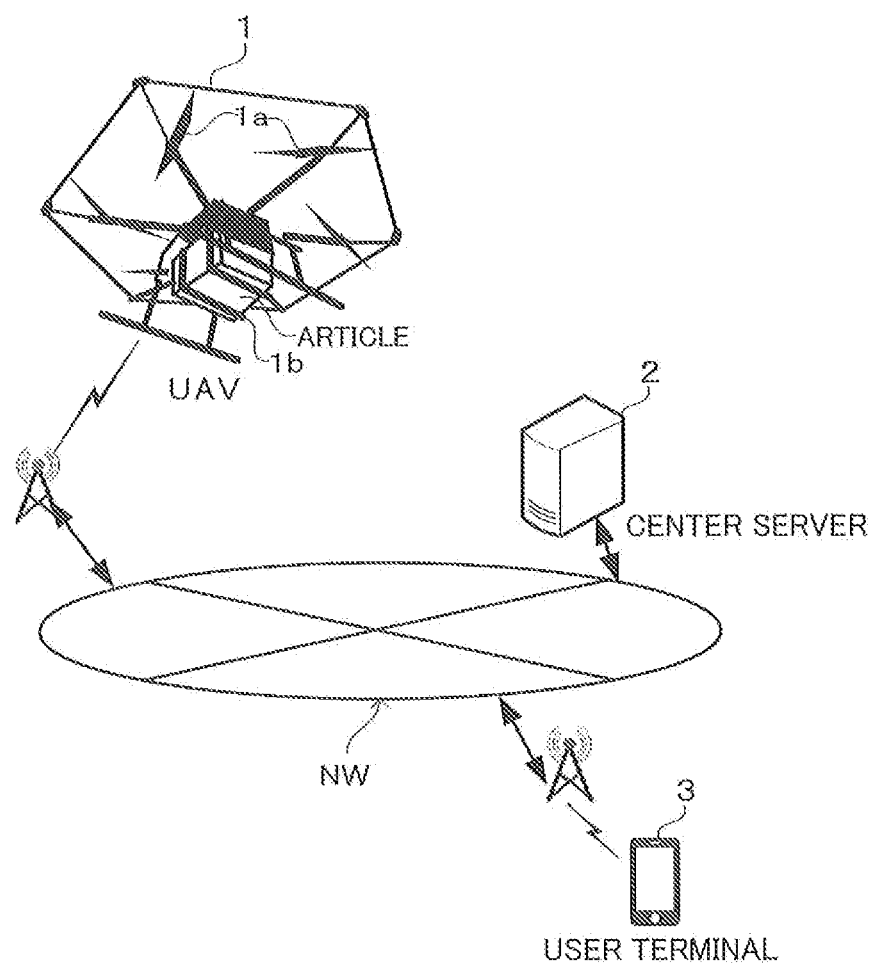
FIG. 1 is a diagram illustrating a schematic configuration example of a delivery control system S.

First, a configuration and an operation overview of a delivery control system S according to the present embodiment will be described with reference to FIGS. 1 and 2. FIG. 1 is a diagram illustrating a schematic configuration example of the delivery control system S. As shown in FIG. 1, the delivery control system S includes a UAV 1, a center server 2 (an example of a delivery control device), and the like. The UAV 1 and the center server 2 are each connected to a communication network NW. The communication network NW includes, for example, the Internet, a mobile communication network and a radio base station thereof, and the like. Incidentally, although one UAV 1 is shown in the example of FIG. 1, a plurality of UAVs 1 actually exist. The UAV 1 can fly from a delivery source of an article to a delivery destination of the article from the ground in accordance with remote control by an operator or can autonomously fly in the air. The center server 2 is a server that manages and controls delivery. Moreover, the center server 2 can receive a delivery request (for example, the request may include an order for an article) of an article from a user terminal 3 used by a user (for example, a delivery requester) via the communication network NW, and processes the received delivery request.

The delivery source is a place having a facility (for example, a store or a warehouse) that handles an article to be delivered as a package (cargo). The delivery source includes a first delivery source where one or a plurality of UAVs 1 are deployed and a second delivery source where no UAV 1 is deployed. The first delivery source may include a UAV base together with the facility that handles the article. The UAV base is provided with a facility for storing the UAV 1. In the present embodiment, the second delivery source is located closer to the delivery destination than the first delivery source. The delivery destination is a place designated by the user, and is near an entrance of a building (for example, a main entrance of a detached house or a first floor entrance of a multiple dwelling house such as an apartment), a rooftop of a building, or the like, but is not particularly limited thereto, and may be, for example, an evacuation place.

The article to be delivered may be, for example, an item (e.g., a product) ordered by the user on an EC (Electronic Commerce) site or the like, or may be a relief supply or a support supply designated by the user on a special website. Attribute information is associated with each article. The attribute information includes, for example, at least one of the type of the article and the weight of the article. Examples of article type include food (which may include beverages), baby goods, daily necessities, and books. Here, the type of food is classified into food that needs to be kept cool for maintaining the state or quality, food that is preferably kept warm for enjoying deliciousness, food that does not need to be kept cool and warm (for example, confectionery, processed food, and the like), and the like.

The type of food that needs to be kept cool is further classified into refrigerated food (for example, fresh food such as vegetables, fruits, fresh fish, and meat), frozen food (for example, ice cream), and the like. On the other hand, food that is preferably kept warm is, for example, food (for example, fried food, box lunch) that is preferably warmed at a relatively high temperature of about 60° C. to 80° C. inclusive. In a case where the type of food is food that needs to be kept cool or food that is preferably kept warm, the attribute information of the food may include a time limit (hereinafter referred to as "lead time") for limiting a delivery time in a state where the food is held (for example, loaded or suspended) in the UAV 1 (in other words, a holding duration time in the UAV 1). The lead time is a set time which is set in accordance with the type of food or in relation to the temperature.

For example, in a case where the type of food is frozen food, the lead time (for example, 5 to 10 minutes inclusive) is set in consideration of an estimated time until the food melts in a state where the food is held in the UAV 1. Moreover, in a case where the type of food is refrigerated food, the lead time (for example, 30 minutes to 50 minutes inclusive) is set in consideration of an estimated time until bacteria propagate in the food. Moreover, in a case where the type of food is food that is preferably kept warm, the lead time (for example, 1 to 2 minutes inclusive) is set in consideration of an estimated time until the food is cooled. These lead times can be said to be times during which the state or quality of food can be maintained in a space in which temperature adjustment is not performed by a temperature adjustment mechanism. An article for which the lead time is set is referred to as "article with lead time", and an article for which no lead time is set is referred to as "article without lead time". The estimated time may be calculated on the basis of, for example, threshold temperature information or deterioration speed information of the food. Incidentally, frozen food, refrigerated food, and food that is preferably kept warm are classified as articles of a specific type (for example, a type in which a degree of time-series change in state or quality is equal to or greater than a threshold value) determined on the basis of the degree of time-series change in state or quality in accordance with a temperature zone (that is, whether the state or quality is likely to change over time in accordance with the temperature zone).

The delivery method of the article to be delivered includes a first delivery method for delivering an article handled at a first delivery source to the delivery destination by the UAV 1 deployed at a UAV base at the first delivery source (hereinafter referred to as "same-base UAV 1" as appropriate), and a second delivery method for delivering an article handled at a second delivery source to the delivery destination by the UAV 1 deployed at a UAV base at a place (another place) different from the second delivery source (hereinafter referred to as "different-base UAV 1" as appropriate). Here, the UAV base located at the place different from the second delivery source may be a UAV base located at the first delivery source or may be a UAV base which is not located at the first delivery source (a UAV base not provided in the facility). In the case of the first delivery method, after the article is held by the same-base UAV 1 at the first delivery source, the UAV 1 takes off from the first delivery source and delivers the article to the delivery destination. On the other hand, in the case of the second delivery method, the different-base UAV 1 takes off and stops (drops) at the second delivery source, and after the article is held by the UAV 1 at the second delivery source, the UAV 1 takes off from the second delivery source and delivers the article to the delivery destination.

Figure 2:
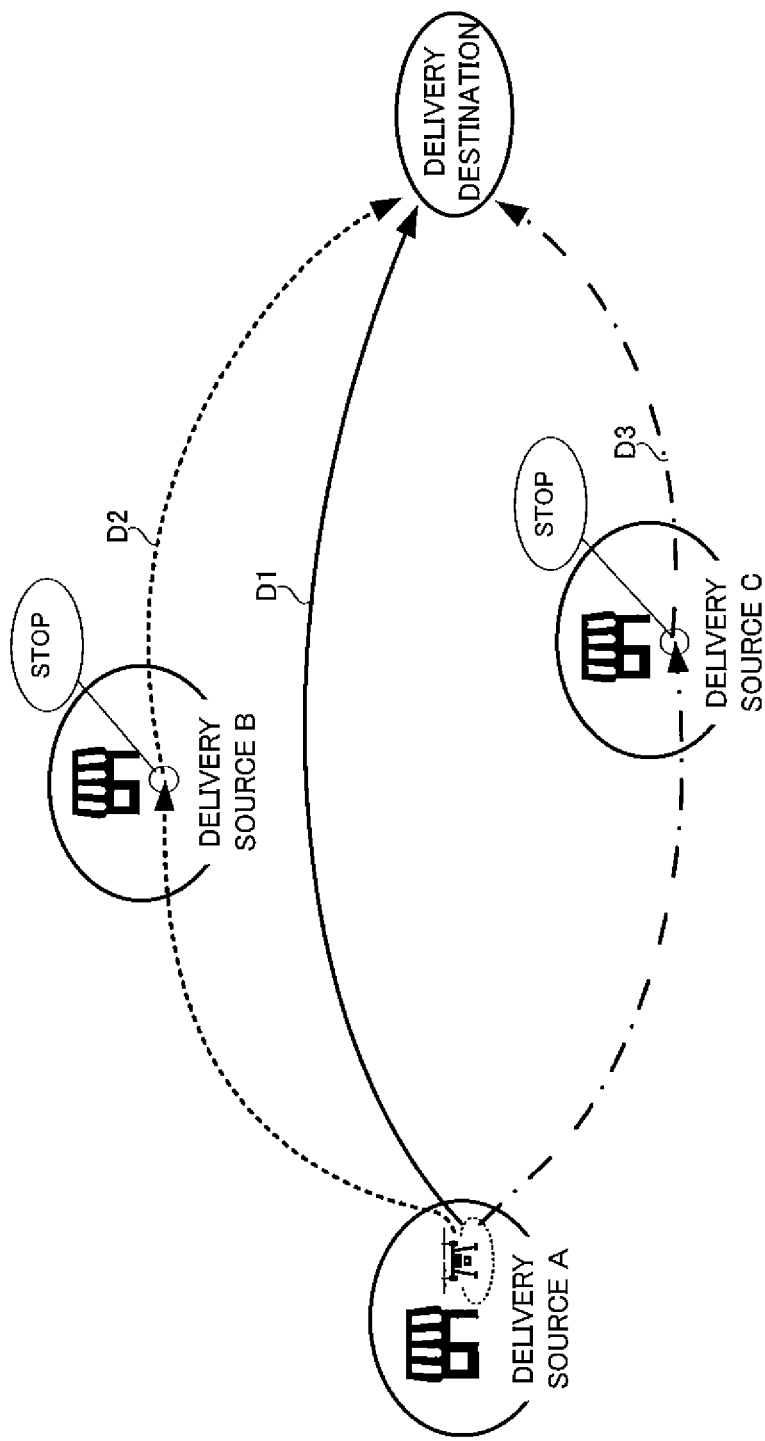
FIG. 2 is a conceptual diagram illustrating a state in which an article is delivered to a delivery destination by using an UAV 1.

FIG. 2 is a conceptual diagram illustrating a state in which an article is delivered to a delivery destination by using the UAV 1. A delivery source A shown in FIG. 2 is an example of the first delivery source, and a delivery source B and a delivery source C are examples of the second delivery source. Incidentally, in this example, the delivery source A, which is an example of the first delivery source, corresponds to the above-described different base. In a case of a first delivery method D1 shown in FIG. 2, takeoff (departure) at the delivery source A and landing (arrival) at the delivery destination are performed. On the other hand, in a case of a second delivery method D2 shown in FIG. 2, takeoff at the delivery source A, landing at the delivery source B, takeoff at the delivery source B, and landing at the delivery destination are performed. Thus, the first delivery method D1 requires only one takeoff process and one landing process of the UAV 1, whereas in the second delivery method D2 (the same applies to the second delivery method D3), a plurality of takeoff processes and a plurality of landing processes are performed. In particular, in the delivery by the UAV 1, the processes of takeoff and landing consume the most energy and take the most time, and thus, it is desirable to deliver the article by the first delivery method D1 in which the processes of takeoff and landing are performed only once. Moreover, the first delivery method D1 has advantages that, for example, the facility side is more flexible and the operation is simple compared to the second delivery method D2. From this point of view, the first delivery method D1 can be said to be a delivery method that places importance on the delivery efficiency of article.

On the other hand, the delivery time in the state where the article is held in the UAV 1 from the delivery source A to the delivery destination is longer than the delivery time in the state where the article is held in the UAV 1 from the delivery source B to the delivery destination. Therefore, depending on attribute information of the article (for example, the type and weight of the article), the possibility of quality deterioration of the article or the possibility of battery exhaustion of the UAV 1 may increase. Therefore, it may be desirable to deliver the article by the second delivery method D2 rather than the first delivery method D1. From such a viewpoint, the second delivery method D2 (the same applies to the third delivery method D3) can be said to be a delivery method that places importance on the attribute information of the article. In the present embodiment, as described below, it is possible to implement a delivery in which importance is placed on the delivery efficiency of an article or a delivery in which importance is placed on the attribute information of the article in accordance with the article which is designated as a delivery target.

[1-1. Configuration and Functions of UAV 1]

Figure 3:
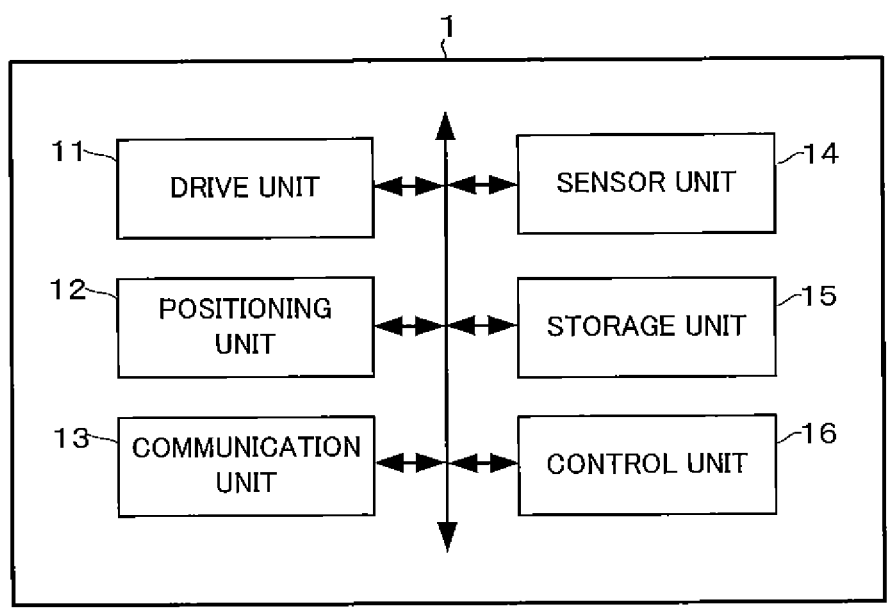
FIG. 3 is a diagram illustrating a schematic configuration example of the UAV 1.

Next, the configuration and functions of the UAV 1 will be described with reference to FIG. 3 and the like. FIG. 3 is a diagram illustrating a schematic configuration example of the UAV 1. As shown in FIG. 3, the UAV 1 includes a driving unit 11, a position measuring unit 12, a communication unit 13, a sensor unit 14, a storage unit 15, a control unit 16, and the like, and includes a battery (not shown) that supplies power to these units. Moreover, as shown in FIG. 1, the UAV 1 includes a rotor (propeller) 1a which is a horizontal rotary wing, a holding member 1b which holds an article, and the like. The holding member 1b may hold a loading box for loading an article. The holding member 1b may be a member for suspending an article or a loading box thereof. Further, the UAV 1 includes a holding mechanism and the like, which are not shown. The holding mechanism includes an actuator constituted by a motor or the like. The holding mechanism releases the article from the holding member 1b (that is, separates the article) by driving the actuator in response to a control signal output from the control unit 16. Incidentally, the holding mechanism may include a linear member such as a wire connected to the holding member 1b and reels (winches) for feeding or winding the linear member.

The driving unit 11 includes a motor, a rotation shaft, and the like. The driving unit 11 rotates a plurality of the rotors 1a by the motor, the rotation shaft, and the like that are driven in response to a control signal output from the control unit 16. The position measuring unit 12 includes a radio receiver, an altitude sensor, and the like. The position measuring unit 12 receives, for example, radio waves transmitted from satellites of GNSS (Global Navigation Satellite System) by a radio receiver and detects the current position of the UAV 1 in the horizontal direction on the basis of the radio waves. Position information (for example, latitude and longitude) indicating the current position detected by the position measuring unit 12 is output to the control unit 16. Further, the position measuring unit 12 may detect the current position (altitude) of the UAV 1 in the vertical direction by an altitude sensor such as an air pressure sensor. In this case, the position information includes altitude information indicating the altitude of the UAV 1. The communication unit 13 has a wireless communication function and controls communication performed via the communication network NW.

The sensor unit 14 includes various sensors used for flight control and the like of the UAV 1. The various sensors include, for example, an optical sensor, a 3-axis angular velocity sensor, a 3-axis acceleration sensor, and a ground magnetic sensor. The optical sensor includes a camera (for example, an RGB camera), and continuously images a real space within a range of the camera's angle of view. Sensing information sensed by the sensor unit 14 is output to the control unit 16. The sensing information may be sequentially transmitted to the center server 2 by the communication unit 13 together with a vehicle ID of the UAV 1. The vehicle ID of the UAV 1 is identification information for identifying the UAV 1.

The storage unit 15 includes a non-volatile memory and the like, and stores various programs and data. Moreover, the storage unit 15 stores the vehicle ID of the UAV 1. The control unit 16 includes at least one CPU (Central Processing Unit), a ROM (Read Only Memory), a RAM (Random Access Memory), and the like, and executes various controls in accordance with a program stored in the ROM (or the storage unit 15). The various controls include flight control (including takeoff control and landing control). In the flight control, the control unit 16 controls the rotation speed of the rotor 1a and the position, the posture, and the traveling direction of the UAV 1 using the position information acquired from the position measuring unit 12, the sensing information acquired from the sensor unit 14, third position information (for example, latitude and longitude) of the delivery destination, and the like. Incidentally, in the case of the second delivery method described above, second position information (for example, latitude and longitude) of a second delivery source is further used. The third position information of the delivery destination and the second position information of the second delivery source are acquired from, for example, the center server 2. During the flight of the UAV 1, the position information of the UAV 1 is sequentially transmitted to the center server 2 by the communication unit 13 together with the vehicle ID of the UAV 1.

[1-2. Configuration and Functions of Center Server 2]

Figure 4:
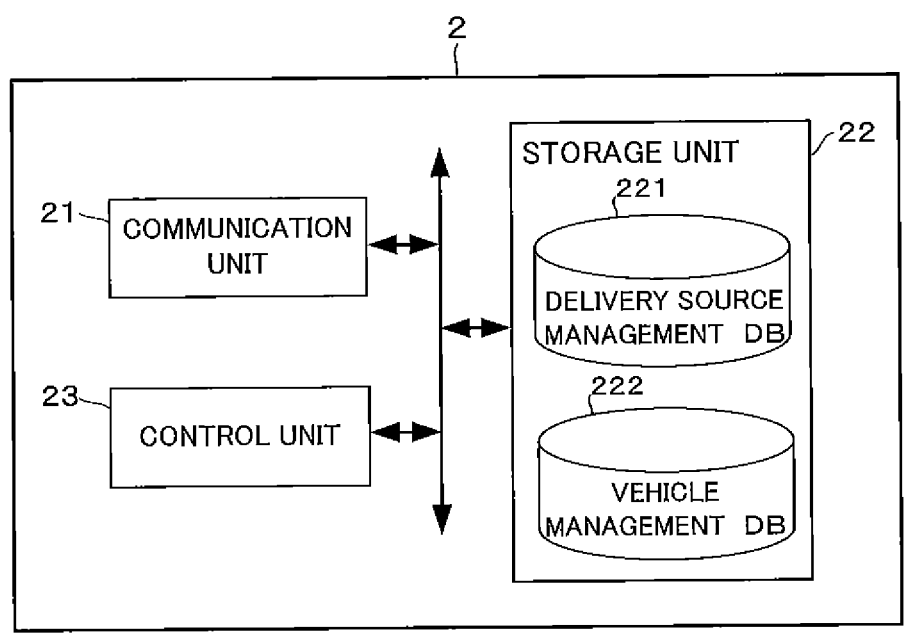
FIG. 4 is a diagram illustrating a schematic configuration example of a center server 2.

Next, the configuration and functions of the center server 2 will be described with reference to FIG. 4. FIG. 4 is a diagram illustrating a schematic configuration example of the center server 2. As shown in FIG. 4, the center server 2 includes a communication unit 21, a storage unit 22, a control unit 23, and the like. The communication unit 21 controls communication performed via the communication network NW. The storage unit 22 includes, for example, a hard disk drive and the like, and stores various programs and the like including an operating system and an application. Here, the application includes a program for executing the delivery control method. Further, a delivery source management database (DB) 221, a vehicle management database 222 (DB), and the like are constructed in the storage unit 22. Incidentally, the delivery source management database 221 and the vehicle management database 222 may be provided in a server (for example, a database server) different from the center server 2.

The delivery source management database 221 is a database for managing information on the delivery source of the article. The delivery source management database 221 stores (registers), for example, a delivery source ID of a delivery source, a name of the delivery source (for example, a facility name), position information of the delivery source (that is, position information indicating an installation position of the delivery source), article information of an article handled at the delivery source (for example, an article to be sold or an article to be stored), presence and absence information of UAV, and the like in association with each delivery source. Here, the delivery source ID of the delivery source is identification information for identifying the delivery source. The presence and absence information of UAV indicates whether or not the UAV 1 is deployed at the delivery source. In a case where the UAV 1 is deployed at the delivery source, the presence and absence information of UAV includes the vehicle ID of the UAV 1. The article information of the article handled at the delivery source includes an article ID, an article name, an article image, specifications, a price, a stock status (that is, whether or not the article is in stock), and attribute information of the article. The article ID is identification information for identifying the article. Incidentally, in a case where the article is an item (e.g., product), the article information includes the price of the article.

The vehicle management database 222 is a database for managing information related to the UAV 1. The vehicle management database 222 stores (registers), for example, the vehicle ID of the UAV 1, first position information of the UAV base (for example, the first delivery source) where the UAV 1 is deployed, and a vehicle upper limit value (hereinafter referred to as "vehicle upper limit value of the UAV 1") set in advance as the weight that the UAV 1 can hold (for example, the weight that the UAV 1 can load or can suspend) in association with each UAV 1. Incidentally, a user management database for managing information on users may be managed by the center server 2. In this case, the user management database stores a user ID, a name, a mail address, and the like in association with each user. Delivery destination information indicating a delivery destination of an article (that is, a delivery destination designated in advance) may be registered in the user management database. The user ID is identification information for identifying a user, and is used for logging in to the system.

The control unit 23 includes at least one CPU, a ROM, a RAM, and the like, and performs various processes according to the programs (program code) stored in the ROM or the storage unit 22. The CPU (an example of processor) is configured to access the program code stored in the storage unit 22 or the memory and operate as instructed by the program code. The program code includes: management code configured to cause the CPU to manage first position information of a first delivery source where an article to be delivered is handled and an UAV 1 is deployed, and second position information of a second delivery source where the article is handled and no UAV 1 is deployed; acquisition code configured to cause the CPU to acquire attribute information of an article which is designated as a delivery target by a user and third position information of a delivery destination of the article among the articles handled respectively at the first delivery source and the second delivery source; and selection code configured to cause the CPU to select, on the basis of at least attribute information of the article, any one delivery method of a first delivery method for delivering the article handled at the first delivery source to the delivery destination by the UAV 1 and a second delivery method for delivering the article handled at the second delivery source to the delivery destination by an UAV 1 deployed at a base located at a place different from the second delivery source. The program code further includes a control code configured to cause the CPU to cause a user terminal to display, on a screen for the user to designate the article, first display information of the first delivery source where the article is handled in preference to second display information of the second delivery source where the article is handled. The program code further includes control code configured to cause the CPU to cause the UAV 1 to deliver the article which has been designated to the delivery destination on the basis of the selected first delivery method or the selected second delivery method. The program code further includes control code configured to cause the CPU to cause the UAV 1 to move from the base to the second delivery source to hold the article at the second delivery source, and then to cause the UAV 1 holding the article to deliver the article to the delivery destination.

The program code further includes notification code configured to cause the CPU to notify the user, in a case where the calculated second predicted delivery time is not equal to or less than the time limit, of a message indicating that it is difficult to deliver the article which has been designated, prompting the user to re-designate an article, or indicating that a quality of the article may deteriorate due to a delivery of the article which has been designated. The program code further includes notification code configured to cause the CPU to notify the user, in a case where the selection code causes the CPU to calculate the second predicted delivery times respectively for a plurality of the second delivery sources located at different places and any of the calculated second predicted delivery times is not equal to or less than the time limit, of a message indicating that it is difficult to deliver the article which has been designated, prompting the user to re-designate an article, or indicating that a quality of the article may deteriorate due to a delivery of the article which has been designated. The program code further includes notification code configured to cause the CPU to notify the user, in a case where the weight of the article is not equal to or less than the calculated second upper limit value, of a message indicating that it is difficult to deliver the article which has been designated or prompting the user to re-designate an article. Incidentally, the processor may be implemented using circuitry or processing circuitry which includes general purpose processors, special purpose processors, integrated circuits, ASICs, conventional circuitry and/or combinations thereof which are configured or programmed to perform the disclosed functionality. The processor may be hardware (or a combination of hardware and software) that carry out or are programmed to perform the recited functionality.

Figure 5:
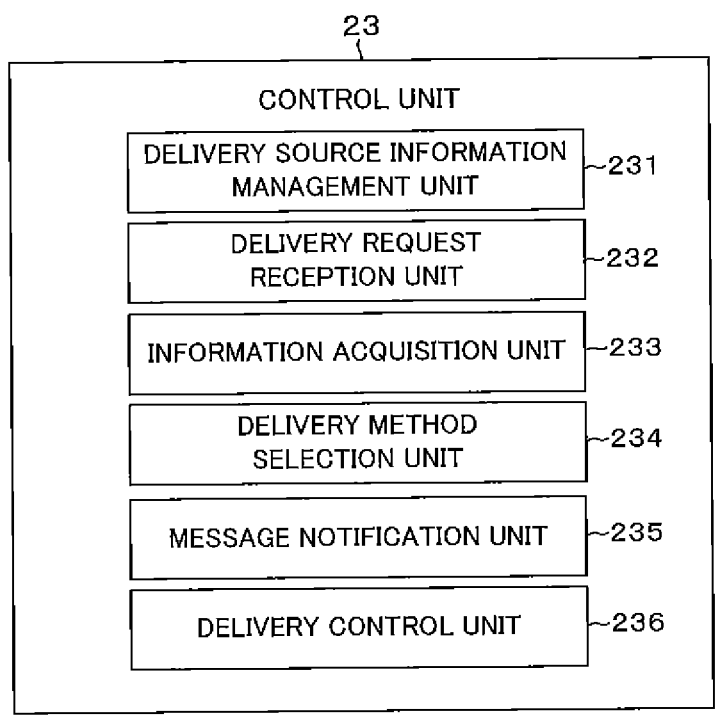
FIG. 5 is a diagram illustrating an example of functional blocks of a control unit 23.

FIG. 5 is a diagram illustrating an example of functional blocks of the control unit 23. The control unit 23 functions as a delivery source information management unit 231, a delivery request reception unit 232, an information acquisition unit 233, a delivery method selection unit 234, a message notification unit 235, a delivery control unit 236, and the like, as shown in FIG. 5, in accordance with the program (program code group) stored in the ROM or the storage unit 22, for example.

The delivery source information management unit 231 manages the first position information of the first delivery source and the second position information of the second delivery source by using the delivery source management database 221. Thus, the delivery source information management unit 231 can identify the positional relation between the first delivery source and the second delivery source. Incidentally, in a case where the delivery source management database 221 is provided in a server different from the center server 2, the delivery source information management unit 231 can also manage the first position information of the first delivery source and the second position information of the second delivery source by accessing the center server 2.

The delivery request reception unit 232 receives a delivery request for an article designated by the user. The delivery request includes, for example, the article ID of the article and delivery destination information indicating the designated delivery destination (for example, the position information or address of the delivery destination). Incidentally, the first delivery source may be designated by the user, and in this case, the delivery request includes the delivery source ID of the first delivery source designated by the user.

The information acquisition unit 233 acquires attribute information of an article designated by the user and third position information of the delivery destination of the article among articles handled respectively at the first delivery source and the second delivery source. Here, the attribute information of the article may be acquired from the delivery source management database 221 on the basis of the article ID included in the delivery request. Moreover, the third position information of the delivery destination of the article is acquired on the basis of the delivery destination information included in the delivery request. Moreover, the information acquisition unit 233 may acquire the first position information of the first delivery source where the article is handled and the second position information of the second delivery source where the article is handled.

The delivery method selection unit 234 selects, on the basis of at least the attribute information of the article, any one delivery method of the first delivery method for delivering the article handled at the first delivery source to the delivery destination by the same-base UAV 1 and the second delivery method for delivering the article handled at the second delivery source to the delivery destination by the different-base UAV 1. This makes it possible to implement a delivery in which importance is placed on the delivery efficiency of the article or a delivery in which importance is placed on the attribute information of the article in accordance with the article which is designated by the user. For example, in a case where the attribute information of the article does not include the lead time (that is, in a case of the article without lead time), the delivery method selection unit 234 selects the first delivery method. Thus, in a case where the designated article does not require a limitation of the delivery time, a delivery in which importance is placed on the delivery efficiency of the article can be efficiently implemented. On the other hand, in a case where the attribute information of the designated article includes the lead time (that is, in a case of the article with lead time), the delivery method selection unit 234 selects one delivery method of the first delivery method and the second delivery method on the basis of the first position information of the first delivery source, the second position information of the second delivery source, and the third position information of the delivery destination.

To be more specific, the delivery method selection unit 234 calculates a first predicted delivery time required for delivering the article from the first delivery source to the delivery destination (that is, a time required for the UAV 1 to move from the first delivery source to the delivery destination) on the basis of the first position information of the first delivery source and the third position information of the delivery destination. Here, the first predicted delivery time is calculated by, for example, multiplying a distance along a first delivery route from the first delivery source to the delivery destination by a scheduled speed of the UAV 1 used for the delivery (for example, a predetermined flight speed). The first delivery route (in this example, the flight route) is determined on the basis of, for example, the first position information of the first delivery source, the third position information of the delivery destination, and the possible flight area of the UAV 1.

And then, in a case where the calculated first predicted delivery time is equal to or shorter than the lead time, the delivery method selection unit 234 selects the first delivery method for delivering the article handled at the first delivery source to the delivery destination by the same-base UAV 1. Thus, in a case where a risk of quality deterioration is low, a delivery of the article can be implemented with importance placed on the delivery efficiency of the article in accordance with the designated article. On the other hand, in a case where the calculated first predicted delivery time is not equal to or shorter than the lead time (that is, exceeds the lead time), the delivery method selection unit 234 calculates a second predicted delivery time required for delivering the article from the second delivery source to the delivery destination (that is, a time required for the UAV 1 to move from the second delivery source to the delivery destination) on the basis of the third position information of the delivery destination and the second position information of the second delivery source. Here, the second predicted delivery time is calculated by, for example, multiplying the distance along a second delivery route from the second delivery source to the delivery destination by a scheduled speed of the UAV 1 used for the delivery. The second delivery route is determined on the basis of, for example, the second position information of the second delivery source, the third position information of the delivery destination, and a possible flight area of the UAV 1.

And then, in a case where the calculated second predicted delivery time is equal to or shorter than the lead time, the delivery method selection unit 234 selects the second delivery method for delivering the article handled at the second delivery source to the delivery destination by the different-base UAV 1. Thus, in a case where a risk of quality deterioration is high, a delivery that suppresses the quality deterioration of the article can be implemented in accordance with the designated article. Incidentally, in a case where there are a plurality of second delivery sources where the article is handled at different places, the delivery method selection unit 234 calculates the second predicted delivery time for each of the plurality of second delivery sources located at different places. And then, in a case where the plurality of second delivery sources for which the second predicted delivery time is equal to or shorter than the lead time are identified, the delivery method selection unit 234 calculates the total time of the second predicted delivery time and the predicted movement time (required time) of the UAV 1 from the different base to the second delivery source for each of the identified plurality of second delivery sources.

Here, the predicted movement time is calculated by, for example, multiplying the distance along a movement route from the different base to the second delivery source by a scheduled speed of the UAV 1 used for the delivery. The movement route (in this example, the flight route) is determined on the basis of, for example, the first position information of the first delivery source, the second position information of the second delivery source, and the possible flight area of the UAV 1. And then, the delivery method selection unit 234 identifies one second delivery source having the shortest total time calculated above and selects the second delivery method for delivering the article handled at the identified second delivery source to the delivery destination by the different-base UAV 1. Thus, an efficient delivery of the article can be implemented while suppressing quality deterioration of the designated article.

FIG. 6 is a diagram illustrating an example of a required time T1 for the UAV 1 to move from the UAV base to each delivery source, a required time T2 for the UAV 1 to move from each delivery source to the delivery destination, and a total time T3 of T1 and T2. In the example of FIG. 6, the delivery source A is the first delivery source, and thus, the required time T1 for the UAV 1 to move from the UAV base is not shown. On the other hand, the delivery source B is the second delivery source, and thus, "10 minutes" is indicated as the required time T1 (predicted movement time) for the UAV 1 to move from the different base (that is, the UAV base that is located at a place different from the delivery source B). Similarly, the delivery source C is the second delivery source, and thus, "12 minutes" is indicated as the required time T1 (predicted movement time) for the UAV 1 to move from the different base (that is, the UAV base that is located at a place different from the delivery source C). Incidentally, in this example, the different base corresponds to the delivery source A which is an example of the first delivery source. Moreover, as the required time T2 (predicted delivery time) for the UAV 1 to move from each of the delivery sources A to C to the delivery destination, "20 minutes", "12 minutes", and "8 minutes" are indicated, respectively. Here, for example, in a case where the lead time of the article is "18 minutes", the required time T2 (20 minutes) corresponding to the delivery source A exceeds the lead time (18 minutes), and thus, the first delivery method is not selected. On the other hand, the required times T2 (12 minutes, 8 minutes) corresponding to the delivery sources B, C are both equal to or shorter than the lead time (18 minutes), and thus, the second delivery method is selected. At this time, the delivery source C having a shorter total time T3 which totalizes T1 and T2 is identified, and the second delivery method for delivering the article handled at the identified delivery source C to the delivery destination by the different-base UAV 1 is selected.

Moreover, in a case where the attribute information of the designated article includes the weight of the article, the delivery method selection unit 234 calculates a first upper limit value of the weight that can be held by the same-base UAV 1 (hereinafter referred to as "first held weight upper limit value") in delivery from the first delivery source to the delivery destination on the basis of the vehicle upper limit value of the same-base UAV 1 (that is, the UAV base located at the first delivery source), the third position information of the delivery destination, and the first position information of the first delivery source. Here, the first held weight upper limit value is calculated, for example, by multiplying the vehicle upper limit value of the same-base UAV 1 by a coefficient corresponding to the distance along the first delivery route from the first delivery source to the delivery destination. For example, the coefficient decreases as the distance increases. Alternatively, the first held weight upper limit value may be calculated by multiplying the vehicle upper limit value of the same-base UAV 1 by a coefficient corresponding to the first predicted delivery time. For example, the coefficient decreases as the time increases.

And then, in a case where the weight of the designated article is equal to or less than the first held weight upper limit value, the delivery method selection unit 234 selects the first delivery method for delivering the article handled at the first delivery source to the delivery destination by the same-base UAV 1. Thus, in a case where a risk of battery exhaustion of the UAV 1 is low, a delivery of the article can be implemented with importance placed on the delivery efficiency of the article in accordance with the designated article. Here, when the weight of the article is equal to or less than the first held weight upper limit value, the first delivery method may not be selected in a case where the first predicted delivery time required for the delivery of the article is not equal to or shorter than the lead time.

On the other hand, in a case where the weight of the designated article is not equal to or less than the first held weight upper limit value, the delivery method selection unit 234 calculates a second upper limit value of the weight that can be held by the different-base UAV 1 (hereinafter referred to as "second held weight upper limit value") in delivery from the second delivery source to the delivery destination on the basis of the vehicle upper limit value of the different-base UAV 1 (that is, the UAV base located at a place different from the second delivery source), the third position information of the delivery destination, and the second position information of the second delivery source. Here, the second held weight upper limit value is calculated, for example, by multiplying the vehicle upper limit value of the different-base UAV 1 by a coefficient corresponding to the distance along the second delivery route from the second delivery source to the delivery destination. For example, the coefficient decreases as the distance increases. Alternatively, the second held weight upper limit value may be calculated by multiplying the vehicle upper limit value of the different-base UAV 1 by a coefficient corresponding to the second predicted delivery time. For example, the coefficient decreases as the time increases.

Incidentally, in calculating the above-described held weight upper limit value (first held weight upper limit value or second held weight upper limit value), the delivery method selection unit 234 may use a table defining weights associated respectively with ranges in which distances (or times) are divided into stages. For example, in the table, 7.0 kg (=vehicle upper limit value) is associated with a range (1) of 0 m to 500 m inclusive, 6.0 kg is associated with a range (2) of 500 m to 1000 m inclusive, and 5.7 kg is associated with a range (3) of 1000 m to 1300 m inclusive. In this case, the weight associated with the distance (or time) along the delivery route from the delivery source to the delivery destination is identified from the table as the held weight upper limit value.

And then, in a case where the weight of the designated article is equal to or less than the second held weight upper limit value, the delivery method selection unit 234 selects the second delivery method for delivering the article handled at the second delivery source to the delivery destination by the different-base UAV 1. Thus, in a case where a risk of battery exhaustion of the UAV 1 is high, a delivery which suppresses battery exhaustion of the UAV 1 can be implemented in accordance with the designated article. Incidentally, in a case where there are the plurality of second delivery sources where the article is handled at different places, the delivery method selection unit 234 calculates the second held weight upper limit value for each of the plurality of second delivery sources located at different places. And then, in a case where the plurality of second delivery sources with weights of the article equal to or less than the second held weight upper limit value are identified, the delivery method selection unit 234 identifies one second delivery source having the largest second held weight upper limit value among the identified plurality of second delivery sources, and selects the second delivery method for delivering the article handled at the identified second delivery source to the delivery destination by the different-base UAV 1. This makes it possible to appropriately deliver the designated article while suppressing the battery exhaustion of the UAV 1.

FIG. 7 is a diagram illustrating an example of the held weight upper limit value of the UAV 1 from each delivery source to the delivery destination. Incidentally, the delivery sources A to C shown in FIG. 7 correspond to the delivery sources A to C shown in FIG. 6. In the example of FIG. 7, the held weight upper limit value W from each of the delivery sources A to C to the delivery destination increases in accordance with the required time T2 corresponding to each of the delivery sources A to C (that is, as T2 increases). Here, for example, in a case where a weight of the article is "5.5 kg", the weight of the article (5.5 kg) exceeds the held weight upper limit value W (5.0 kg) corresponding to the delivery source A, and thus, the first delivery method is not selected. On the other hand, the weight of the article (5.5 kg) is equal to or less than the held weight upper limit values W (5.7 kg, 6.0 kg) corresponding respectively to the delivery sources B and C, and thus, the second delivery method is selected. At this time, the delivery source C having a larger held weight upper limit value W (that is, having more room to hold the article) is identified, and the second delivery method for delivering the article handled at the identified delivery source C to the delivery destination by the different-base UAV 1 is selected.

In a case where the calculated second predicted delivery time is not equal to or shorter than the lead time, the message notification unit 235 notifies the user who has designated the article of a message indicating that the delivery of the article is difficult, prompting the user to re-designate an article, or indicating that the quality of the article may deteriorate due to the delivery of the article. This makes it possible for the user who has designated the article to quickly perform a next action. For example, the message notification unit 235 notifies the user of the message by transmitting the message to the user terminal 3 of the user. Moreover, in a case where the weight of the designated article is not equal to or less than the second held weight upper limit value, the message notification unit 235 notifies the user who has designated the article of a message indicating that the delivery of the article is difficult, or prompting the user to re-designate an article. Incidentally, when each of the second predicted delivery time is calculated for each of the plurality of second delivery sources located at different places, in a case where none of the calculated second predicted delivery times is equal to or shorter than the lead time, the message notification unit 235 notifies the user who has designated the article of a message indicating that the delivery of the article is difficult, prompting the user to re-designate an article, or indicating that the quality of the article may deteriorate due to the delivery of the article.

The delivery control unit 236 causes the UAV 1 to deliver the designated article to the delivery destination on the basis of the first delivery method or the second delivery method selected by the delivery method selection unit 234. This makes it possible to perform control to deliver the article to the delivery destination by a more appropriate delivery method in accordance with the designated article. For example, in a case where the first delivery method is selected by the delivery method selection unit 234, the delivery control unit 236 transmits a delivery control command including the third position information of the delivery destination to the UAV 1 of the UAV base located at the first delivery source, thereby delivering the article to the delivery destination. On the other hand, in a case where the second delivery method is selected by the delivery method selection unit 234, the delivery control unit 236 transmits a delivery control command including the third position information of the delivery destination and the second position information of the second delivery source to the UAV 1 of the UAV base located at a place different from the second delivery source, thereby delivering the article to the delivery destination. Thus, even when the delivery efficiency is reduced in a case where a risk of quality deterioration of the designated article is high, a delivery that suppresses the quality deterioration can be implemented by collecting the article to the delivery source where the quality deterioration of the article is less likely to occur.

[2. Operation of Delivery Control System S]

Figure 8:
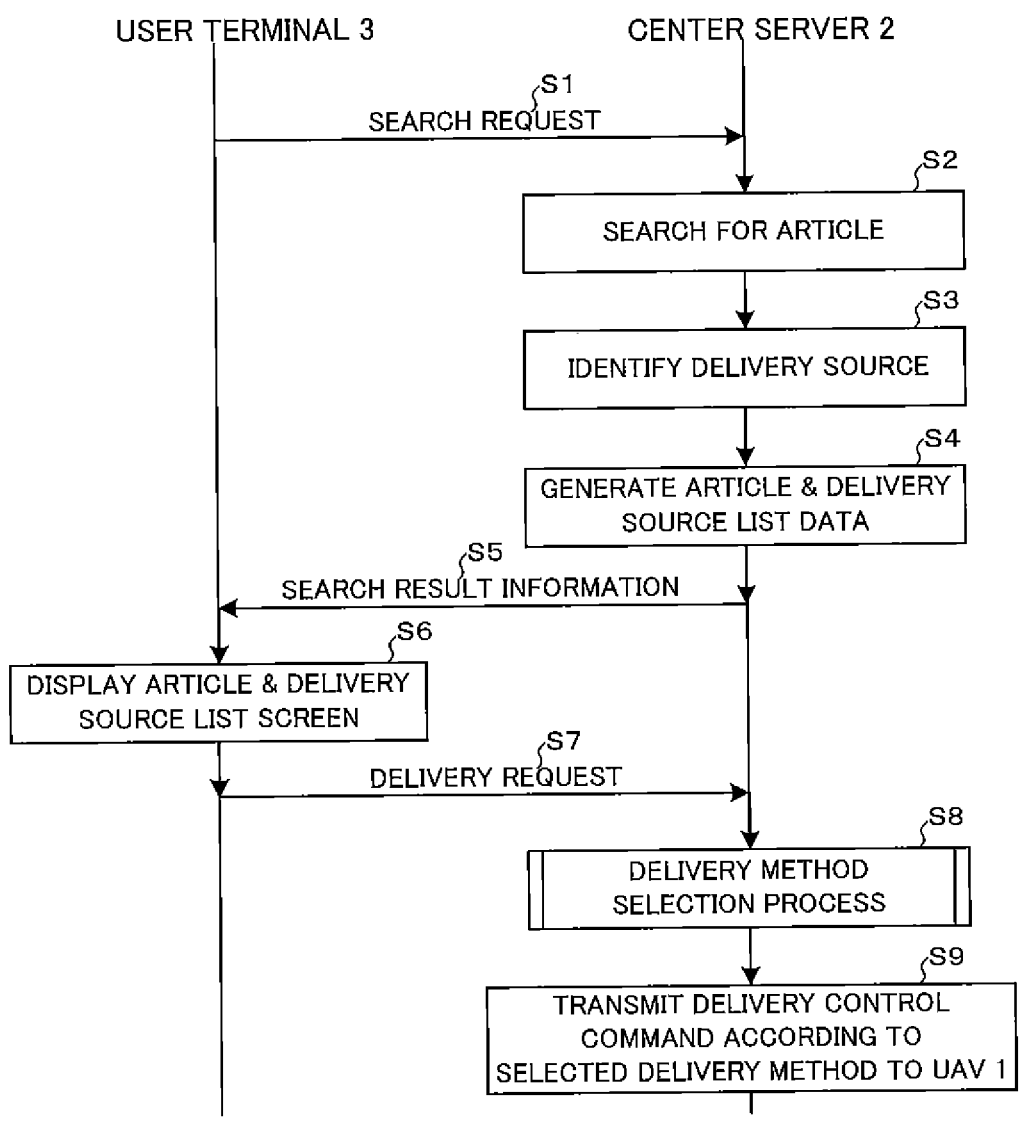
FIG. 8 is a sequence diagram illustrating an example of an operation of the delivery control system S in a case where an order for an article is placed.
Figure 10:
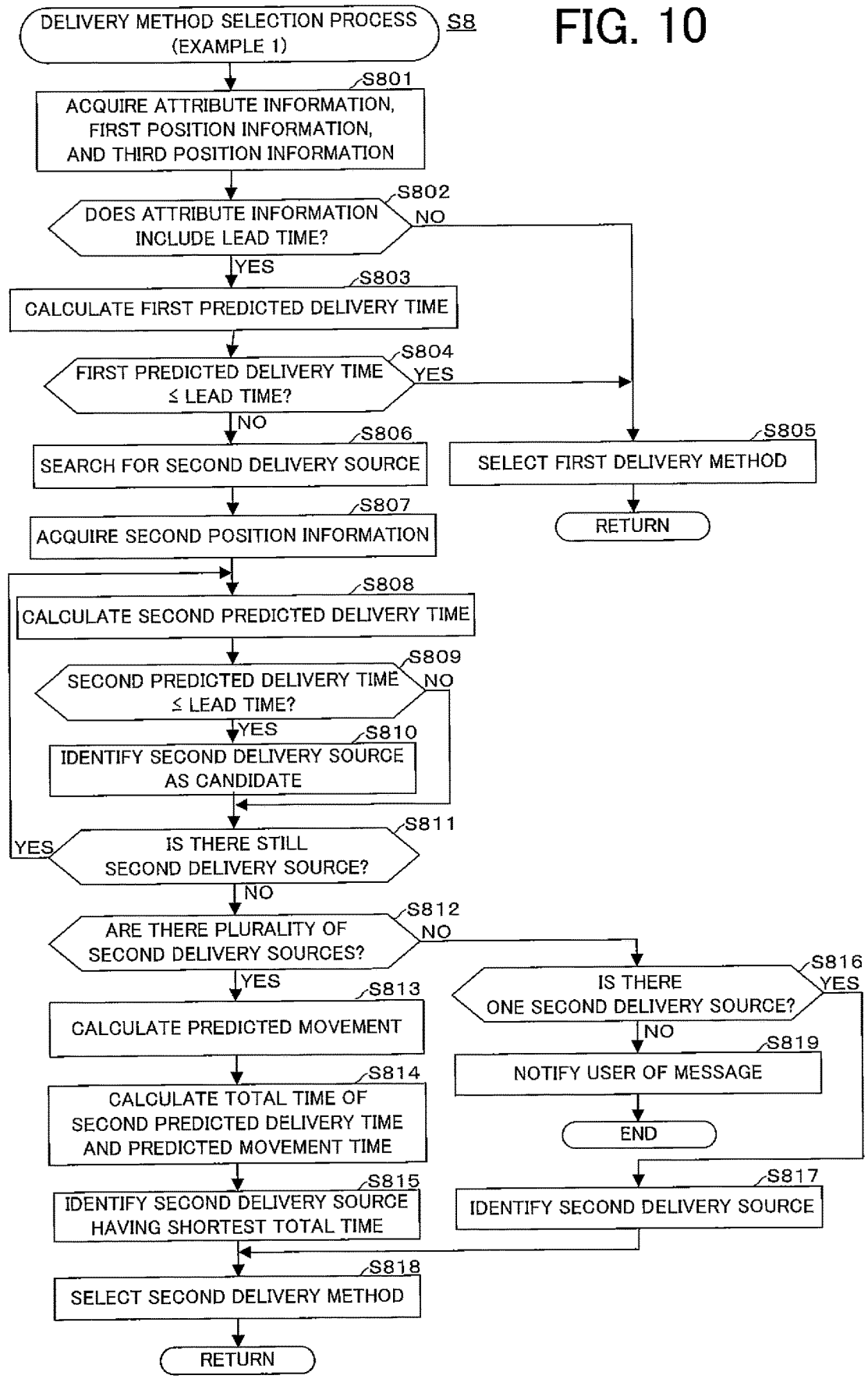
FIG. 10 is a flowchart illustrating a delivery method selection process (Example 1) in Step S8 shown in FIG. 8.
Figure 11:
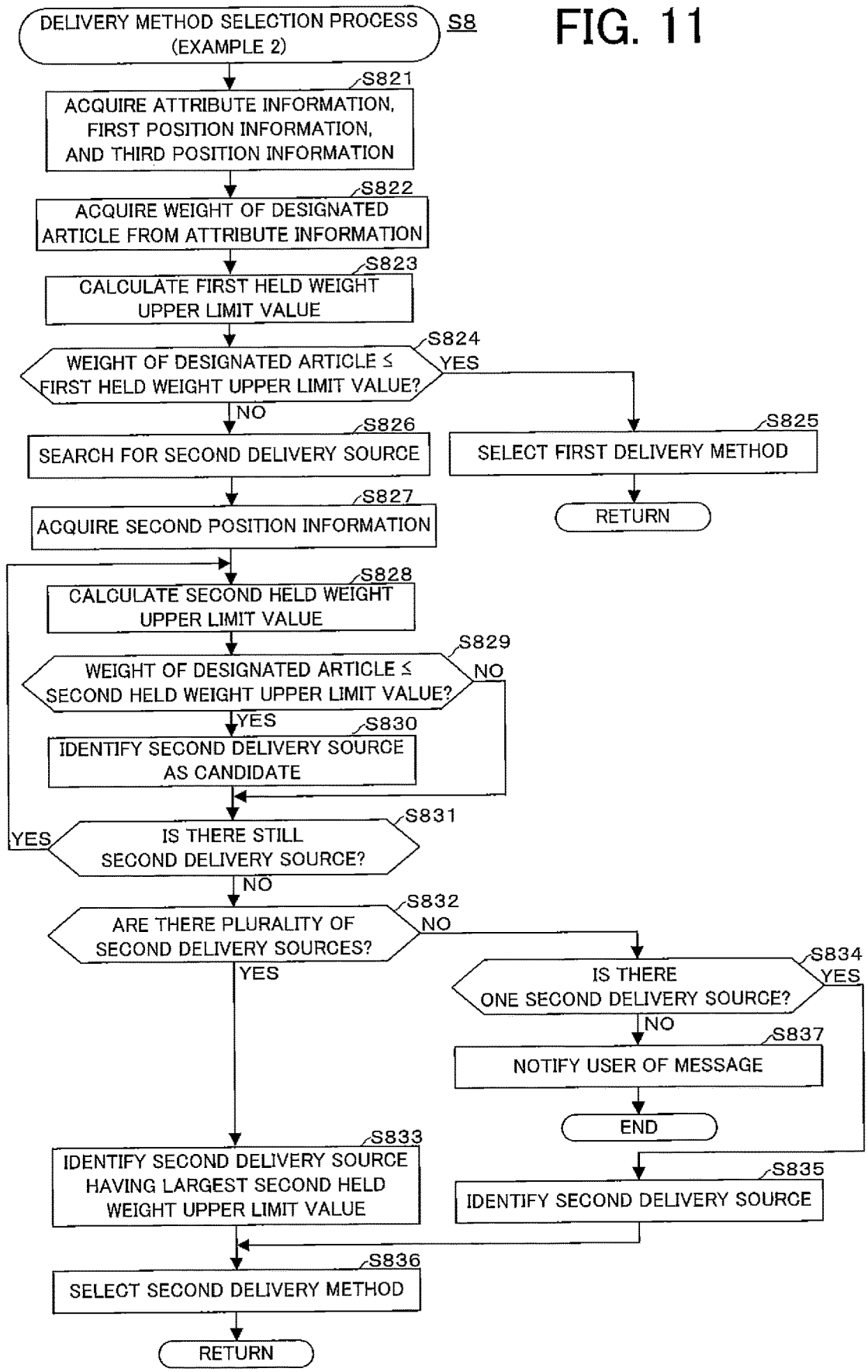
FIG. 11 is a flowchart illustrating a delivery method selection process (Example 2) in Step S8 shown in FIG. 8.

Next, an operation of the delivery control system S in a case where an order for an article is placed will be described with reference to FIGS. 8 to 11. FIG. 8 is a sequence diagram illustrating an example of the operation of the delivery control system S in a case where an order for an article is placed. FIG. 9 is a diagram illustrating an example of a screen of an article & delivery source list displayed on the user terminal 3. FIG. 10 is a flowchart illustrating a delivery method selection process (Example 1) in Step S8 shown in FIG. 8, and FIG. 11 is a flowchart illustrating a delivery method selection process (Example 2) in Step S8 shown in FIG. 8. Incidentally, when an article is ordered, the user of the user terminal 3 may log in after the user terminal 3 accesses the center server 2.

In FIG. 8, the user terminal 3 that has accessed the center server 2 transmits a search request including a search condition designated by the user on a search screen (not shown), for example, to the center server 2 (Step S1). Next, in a case where the center server 2 receives the search request transmitted from the user terminal 3 by the communication unit 21, the control unit 23 searches for an article satisfying the search condition included in the search request (that is, an article satisfying the search condition and being in stock) with reference to the delivery source management database 221 (Step S2). Here, the article which satisfies the search condition and is handled at the first delivery source may be set as the search target (that is, the article handled at the second delivery source may be excluded). The first delivery source may be selected from a predetermined delivery area (for example, a prefecture or a city, ward, town, or village) including the delivery destination of the article.

Here, the delivery destination of the article is designated by the user in the user terminal 3 before the search of the article is executed, for example. In this case, for example, when the user designates a desired delivery destination (for example, inputs an address or selects the address on a map) on a delivery destination designation screen or the search screen displayed on the user terminal 3, delivery destination information indicating the designated delivery destination (for example, Nakameguro, Meguro-ku, Tokyo . . . ) is transmitted from the user terminal 3 to the center server 2. As a result, the delivery destination of the article is identified. Alternatively, in a case where the user is identified by the login, the delivery destination of the article may be identified by the delivery destination information (that is, the delivery destination information registered in advance) associated with the user ID of the user. Incidentally, in accordance with the delivery destination information, the display of the first delivery source and the display of the article handled at the first delivery source are controlled on an order screen or the like to be described later. Alternatively, the user may designate the delivery area on the delivery destination designation screen or the search screen displayed on the user terminal 3. In this case, delivery area information indicating the designated delivery area (for example, Meguro-ku) is transmitted from the user terminal 3 to the center server 2.

Next, the control unit 23 identifies the delivery source of the article found in the search of Step S2 from the delivery source management database 221 (Step S3). Next, the control unit 23 generates an article & delivery source list data on the basis of the information on the delivery source identified in Step S3 (Step S4). The article & delivery source list data is for displaying an article & delivery source list screen (for example, a list page) on the user terminal 3. The article & delivery source list data includes information such as the article name, price, and article image of the searched article, the name of the delivery source where the article is handled, and the delivery source ID of the delivery source.

Here, in a case where the first delivery source and the second delivery source are included in the delivery sources where the searched article is handled, a display setting data in which the display priority (display priority order) of the first delivery source is set to be higher than the display priority of the second delivery source is included in the article & delivery source list data. By the display setting data, on the article & delivery source list screen, first display information (for example, the name of the first delivery source, the article name, the article image, and the like) of the first delivery source where the searched article is handled can be displayed (for example, displayed at the upper portion of the screen) in preference to second display information of the second delivery source where the searched article is handled. This makes it possible to further prioritize the delivery that places importance on the delivery efficiency of the article. In other words, this allows for greater priority to be given to the delivery of designated article with an emphasis on the delivery efficiency. Next, the control unit 23 transmits search result information including the article & delivery source list data generated in Step S4 to the user terminal 3 by the communication unit 21 (Step S5).

Next, in a case where the user terminal 3 receives the search result information transmitted from the center server 2, the user terminal 3 displays the article & delivery source list screen on the basis of the article & delivery source list data included in the search result information (Step S6). On an article & delivery source list screen 51 shown in FIG. 9, display boxes 511 to 513 corresponding respectively to the plurality of first delivery sources are displayed in a selectable list. That is, the list is displayed so that the user can select any one of display boxes 511 to 513. Incidentally, in a case where the second display information of the second delivery source is included in the article & delivery source list data, the display box corresponding to the second delivery source may be displayed after all the display boxes corresponding to the first delivery source are displayed by the user or by the scroll operation or the page feed operation, for example.

In each of display boxes 511 to 513 shown in FIG. 9, the name of the first delivery source and the article name, the article image, the price, and the like of the searched article are displayed. When the user designates a desired article & delivery source (for example, selects the display box 512) to designate a selection confirmation button 514 on the article & delivery source list screen 51, an order screen (not shown) for ordering the designated article is displayed on the user terminal 3. At this time, the user can designate the article and designate the quantity of the article on the article & delivery source list screen 51. Here, the following description will be made on the assumption that the first delivery source is designated by the user on the article & delivery source list screen 51.

A predetermined settlement procedure can be performed on the order screen displayed on the user terminal 3. Incidentally, the designation of the delivery destination of the designated article may be confirmed on the order screen displayed on the user terminal 3. For example, as described above, in a case where the delivery destination is already designated by the user, the designation of the delivery destination is confirmed through the order screen. Alternatively, as described above, in a case where the delivery area is designated by the user, a map of the delivery area is displayed on the order screen, and the designation of the delivery destination is confirmed by designating the delivery destination on the map. When the user designates an order confirmation button (not shown), the user terminal 3 transmits a delivery request (including an order for the designated article) including the article ID of the designated article, the delivery source ID of the designated first delivery source, and the delivery destination information of the designated delivery destination to the center server 2 (Step S7). Incidentally, a plurality of different designated articles and delivery sources where the respective designated articles are handled may be designated, and these delivery sources may be the same or different. Moreover, in a case where the quantity of the designated article is designated, the delivery request includes the quantity.

Next, when the center server 2 receives the delivery request transmitted from the user terminal 3 by the communication unit 21, the control unit 23 accepts the order for the designated article and executes the delivery method selection process (Step S8). Here, first, the delivery method selection process (Example 1) will be described with reference to FIG. 10. Incidentally, in a case where the article ID of each of the plurality of designated articles is included in the delivery request, the delivery method selection process (Example 1) shown in FIG. 10 may be executed for each of the designated articles. In the delivery method selection process (Example 1) shown in FIG. 10, the control unit 23 (the information acquisition unit 233) acquires the attribute information of the designated article, the position information of the delivery source (e.g., the first delivery source), and the third position information of the delivery destination from the above-described database or the like respectively on the basis of the article ID, the delivery source ID, and the delivery destination information included in the received delivery request (Step S801).

Next, the control unit 23 determines whether or not the attribute information acquired in Step S801 includes the lead time (Step S802). That is, it is determined whether or not the designated article is the article with lead time. In a case where it is determined that the attribute information does not include the lead time (Step S802: NO), the control unit 23 (the delivery method selection unit 234) selects the first delivery method for delivering the designated article handled at the first delivery source to the delivery destination by the same-base UAV 1 (Step S805), and returns to the process shown in FIG. 8 (advances the process to Step S9). When the first delivery method is selected in this manner, the first delivery method is assigned to the UAV 1 used for the delivery of the designated article (that is, the UAV 1 of the UAV base located at the first delivery source). On the other hand, in a case where it is determined that the attribute information includes the lead time (Step S802: YES), the lead time is acquired from the attribute information, and the process proceeds to Step S803.

In Step S803, the control unit 23 calculates the first predicted delivery time required for the delivery of the designated article as described above on the basis of the third position information of the delivery destination and the first position information of the first delivery source, acquired in Step S801. Next, the control unit 23 determines whether or not the first predicted delivery time calculated in Step S803 is equal to or shorter than the lead time acquired in Step S802 (Step S804). In a case where it is determined that the first predicted delivery time is equal to or shorter than the lead time (Step S804: YES), the control unit 23 (the delivery method selection unit 234) selects the first delivery method for delivering the designated article handled at the first delivery source to the delivery destination by the same-base UAV 1 (Step S805), and returns to the process shown in FIG. 8. When the first delivery method is selected in this manner, the first delivery method is assigned to the UAV 1 used for the delivery of the designated article. On the other hand, in a case where it is determined that the first predicted delivery time is not equal to or shorter than the lead time (Step S804: NO), the process proceeds to Step S806.

In Step S806, the control unit 23 searches for the second delivery source where the designated article is handled with reference to the delivery source management database 221. For example, the search may be performed from a predetermined delivery area (for example, a prefecture or a city, ward, town, or village) including the delivery destination of the designated article. Next, the control unit 23 (the information acquisition unit 233) acquires the second position information of the second delivery source found in the search of Step S806 (Step S807). Here, in a case where there are a plurality of second delivery sources found in the search of Step S806, the second position information(s) of each second delivery source (that is, the second delivery source having a different installation position are acquired. Incidentally, in a case where there is no second delivery source where the designated article is handled (that is, in a case where there is no second delivery source that has the designated article in stock), the process may proceed to Step S819.

Next, the control unit 23 calculates the second predicted delivery time required for the delivery of the designated article from the second delivery source to the delivery destination (that is, the second predicted delivery time corresponding to the second delivery source) as described above on the basis of the third position information of the delivery destination (the position information acquired in Step S801) and the second position information of the second delivery source (the position information acquired in Step S807) (Step S808).

Next, the control unit 23 determines whether or not the second predicted delivery time calculated in Step S808 is equal to or shorter than the acquired lead time (Step S809). In a case where it is determined that the second predicted delivery time is equal to or shorter than the lead time (Step S809: YES), the second delivery source corresponding to the second predicted delivery time is identified as a candidate (Step S810), and the process proceeds to Step S811. Incidentally, the delivery source ID of the identified second delivery source is registered in, for example, a candidate list. On the other hand, in a case where it is determined that the second predicted delivery time is not equal to or shorter than the lead time (Step S809: NO), the process proceeds to Step S811.

In Step S811, the control unit 23 determines whether or not there is still the second delivery source where the designated article is handled. In a case where it is determined that there is still the second delivery source where the designated article is handled (Step S811: YES), the process returns to Step S808, and the processes from Step S808 onward are performed for the second delivery source that has not been processed (that is, the processes from Step S808 onward have not been performed) among the second delivery sources found in the search of Step S806. On the other hand, in a case where it is determined that there is no more second delivery source where the designated article is handled (that is, all the second delivery sources found in the search of Step S806 have been processed) (Step S811: NO), the process proceeds to Step S812.

In Step S812, the control unit 23 determines whether or not there are a plurality of second delivery sources identified as candidates in Step S810. In a case where it is determined that there are the plurality of second delivery sources identified as candidates (for example, the plurality of delivery source IDs is registered in the candidate list) (Step S812: YES), the process proceeds to Step S813. On the other hand, in a case where it is determined that there are not the plurality of second delivery sources identified as candidates (Step S812: NO), the process proceeds to Step S816.

In Step S813, the control unit 23 calculates the predicted movement time for each of the second delivery sources identified as candidates in Step S810, as described above. For example, the predicted movement time is calculated by multiplying a distance from the UAV base located at the first delivery source to the second delivery source (i.e., the distance along the movement route) by the scheduled speed of the UAV 1 used for the delivery. Next, the control unit 23 calculates the total time of the second predicted delivery time and the predicted movement time for each of the second delivery sources identified as candidates in Step S810, as described above (Step S814). Next, the control unit 23 (the delivery method selection unit 234) identifies one second delivery source having the shortest total time calculated in Step S814 (Step S815). That is, the first delivery source designated by the user is switched to the second delivery source searched by the control unit 23. Incidentally, in a case where there are a plurality of second delivery sources having the shortest total time, any one of the plurality of second delivery sources is identified on the basis of a predetermined condition related to the delivery time.

Next, the control unit 23 (the delivery method selection unit 234) selects the second delivery method for delivering the designated article handled at the second delivery source identified in Step S815 to the delivery destination by the different-base UAV 1 (Step S818), and returns to the process shown in FIG. 8. When the second delivery method is selected in this manner, the second delivery method is assigned to the UAV 1 used for the delivery of the designated article (that is, the UAV 1 of the UAV base located at a place different from the second delivery source).

On the other hand, in Step S816, the control unit 23 determines whether or not there is one second delivery source identified as a candidate in Step S810. In a case where it is determined that there is one second delivery source identified as a candidate (Step S816: YES), the control unit 23 (the delivery method selection unit 234) identifies the second delivery source (Step S817). That is, the first delivery source designated by the user is switched to the second delivery source searched by the control unit 23.

Next, the control unit 23 (the delivery method selection unit 234) selects the second delivery method for delivering the designated article handled at the second delivery source identified in Step S817 to the delivery destination by the different-base UAV 1 (Step S818), and returns to the process shown in FIG. 8. On the other hand, in a case where it is determined that there is not even one second delivery source identified as a candidate (Step S816: NO), the control unit 23, for example, transmits a message indicating that the quality of the designated article may deteriorate to the user terminal 3 by the message notification unit 235 (Step S819), executes a process for canceling the order for the designated item, and ends the process. When the user terminal 3 receives the message from the center server 2, the user terminal 3, for example, displays the message such as "The item may melt (or cool down). Please designate (select) an item again." (for example, pop up on the screen).

Incidentally, the message indicating that the quality of the designated article may deteriorate may be, for example, a message that prompts the user to select whether or not to accept the possibility, such as "The item may melt (or cool down). Are you sure?>Yes/No". In this case, when the user selects "Yes" for acceptance on the user terminal 3 on which the message is displayed, the user terminal 3 transmits acceptance information indicating acceptance of the content of the message to the center server 2. On the other hand, when the user identifies "No" on the user terminal 3 on which the message is displayed, non-acceptance information indicating that the user does not accept the contents of the message is transmitted to the center server 2.

Next, when the center server 2 receives the acceptance information transmitted from the user terminal 3 by the communication unit 21, the control unit 23 selects the first delivery method for delivering the designated article handled at the first delivery source to the delivery destination by the same-base UAV 1, and returns to the process shown in FIG. 8. On the other hand, when the center server 2 receives the non-acceptance information transmitted from the user terminal 3 by the communication unit 21, the control unit 23 executes a process for canceling the order for the designated item and ends the process.

Next, the delivery method selection process (Example 2) will be described with reference to FIG. 11. Incidentally, in a case where the article ID of each of the plurality of designated articles is included in the delivery request, the delivery method selection process (Example 2) shown in FIG. 11 may be executed for each of the designated articles. In the delivery method selection process (Example 2) shown in FIG. 11, the control unit 23 (the information acquisition unit 233) acquires the attribute information of the designated article, the position information of the delivery source (e.g., the first delivery source), and the third position information of the delivery destination respectively on the basis of the article ID, the delivery source ID, and the delivery destination information included in the received delivery request (Step S821).

Next, the control unit 23 acquires the weight of the designated article from the attribute information acquired in Step S821 (Step S822). Here, in a case where the delivery request includes the quantity of the designated article, the acquired weight is multiplied by the quantity. Next, the control unit 23 calculates the first held weight upper limit value of the UAV 1 on the basis of the vehicle upper limit value of the same-base UAV 1 (that is, the UAV base located at the first delivery source) and the first position information of the first delivery source and the third position information of the delivery destination acquired in Step S821, as described above (Step S823). Here, the vehicle upper limit value of the same-base UAV 1 is acquired from the vehicle management database 222. Incidentally, in a case where the designated article has been already assigned to the UAV 1, the vehicle upper limit value is updated by subtracting the weight of the designated article (i.e., article assigned to the UAV 1) from the vehicle upper limit value of the UAV 1, and the updated vehicle upper limit value is used for the calculation of the first held weight upper limit value.

Next, the control unit 23 determines whether or not the acquired weight (weight×quantity) of the designated article is equal to or less than the first held weight upper limit value calculated in Step S823 (Step S824). In a case where it is determined that the weight of the designated article is equal to or less than the first held weight upper limit value (Step S824: YES), the control unit 23 (the delivery method selection unit 234) selects the first delivery method for delivering the designated article handled at the first delivery source to the delivery destination by the same-base UAV 1 (Step S825), and returns to the process shown in FIG. 8. When the first delivery method is selected in this manner, the first delivery method is assigned to the UAV 1 used for the delivery of the designated article. On the other hand, in a case where it is determined that the weight of the designated article is not equal to or less than the first held weight upper limit value (Step S824: NO), the process proceeds to Step S826.

In Step S826, the control unit 23 searches for the second delivery source where the designated article is handled with reference to the delivery source management database 221. Next, the control unit 23 (the information acquisition unit 233) acquires the second position information of the second delivery source found in the search of Step S826 (Step S827). In a case where there are the plurality of second delivery sources found in the search of Step S826, the second position information(s) of each of the second delivery sources are acquired. Incidentally, in a case where there is no second delivery source where the designated article is handled, the process may proceed to Step S837.

Next, the control unit 23 calculates the second held weight upper limit value of the UAV 1 (that is, the second held weight upper limit value corresponding to the second delivery source) as described above on the basis of the vehicle upper limit value of the UAV 1 of a different base (that is, a UAV base located at a place different from the second delivery source), the third position information of the delivery destination (the position information acquired in Step S821), and the second position information of the second delivery source (the position information acquired in Step S827) (Step S828). Here, the vehicle upper limit value of the different-base UAV 1 is acquired from the vehicle management database 222. Incidentally, in a case where the designated article has been already assigned to the UAV 1, the vehicle upper limit value is updated by subtracting the weight of the designated article from the vehicle upper limit value of the UAV 1, and the updated vehicle upper limit value is used for the calculation of the second held weight upper limit value.

Next, the control unit 23 determines whether or not the acquired weight (weight×quantity) of the designated article is equal to or less than the second held weight upper limit value calculated in Step S828 (Step S829). In a case where it is determined that the weight of the designated article is equal to or less than the second held weight upper limit value (Step S829: YES), the second delivery source corresponding to the second predicted delivery time is identified as a candidate (Step S830), and the process proceeds to Step S831. Incidentally, the delivery source ID of the identified second delivery source is registered in, for example, a candidate list. On the other hand, in a case where it is determined that the weight of the designated article is not equal to or less than the second held weight upper limit value (Step S829: NO), the process proceeds to Step S831.

In Step S831, the control unit 23 determines whether or not there is still the second delivery source where the designated article is handled. In a case where it is determined that there is still the second delivery source where the designated article is handled (Step S831: YES), the process returns to Step S828, and the processes from Step S828 onward are performed for the second delivery source that has not been processed among the second delivery sources found in the search of Step S826. On the other hand, in a case where it is determined that there is still no second delivery source where the designated article is handled (Step S831: NO), the process proceeds to Step S832.

In Step S832, the control unit 23 determines whether or not there are a plurality of second delivery sources identified as candidates in Step S830. In a case where it is determined that there are the plurality of second delivery sources identified as candidates (Step S832: YES), the process proceeds to Step S833. On the other hand, in a case where it is determined that there are not the plurality of second delivery sources identified as candidates (Step S832: NO), the process proceeds to Step S834.

In Step S833, the control unit 23 (the delivery method selection unit 234) identifies the second delivery source having the largest second held weight upper limit value among the second delivery sources identified as candidates in Step S830. That is, the first delivery source designated by the user is switched to the second delivery source searched by the control unit 23. Incidentally, in a case where there are a plurality of second delivery sources having the largest second held weight upper limit value, any one of the plurality of second delivery sources is identified on the basis of a predetermined condition related to the delivery time. Next, the control unit 23 (the delivery method selection unit 234) selects the second delivery method for delivering the designated article handled at the second delivery source identified in Step S833 to the delivery destination by the different-base UAV 1 (Step S836), and returns to the process shown in FIG. 8.

On the other hand, in Step S834, the control unit 23 determines whether or not there is one second delivery source identified as a candidate in Step S830. In a case where it is determined that there is one second delivery source identified as a candidate (Step S834: YES), the control unit 23 (delivery method selection unit 234) identifies the second delivery source (Step S835). That is, the first delivery source designated by the user is switched to the second delivery source searched by the control unit 23.

Next, the control unit 23 (the delivery method selection unit 234) selects the second delivery method for delivering the designated article handled at the second delivery source identified in Step S835 to the delivery destination by the different-base UAV 1 (Step S836), and returns to the process shown in FIG. 8. When the second delivery method is selected in this manner, the second delivery method is assigned to the UAV 1 used for the delivery of the designated article.

On the other hand, in a case where it is determined that there is not even one second delivery source identified as a candidate (Step S834: NO), the control unit 23, for example, transmits a message prompting the user to re-designate an article to the user terminal 3 by the message notification unit 235 (Step S837), executes a process for canceling the order for the designated item, and ends the process. When the user terminal 3 receives the message from the center server 2, the user terminal 3, for example, displays the message such as "The upper limit of the deliverable weight of item is exceeded. Please designate (select) an item again." (for example, pop up on the screen).

As described above, when a delivery method is selected in the delivery method selection process (Example 1) or the delivery method selection process (Example 2), the control unit 23 transmits the delivery control command according to the selected delivery method to the UAV 1 used for the delivery of the designated article by the delivery control unit 236 (Step S9). Thus, the control unit 23 causes the UAV 1 to deliver the designated article to the delivery destination on the basis of the delivery method selected for the designated article. Here, in a case where the first delivery method is selected as described above, the delivery control unit 236 transmits a delivery control command including the third position information of the delivery destination to the UAV 1 of the UAV base located at the first delivery source. As a result, the UAV 1 holds the designated article at the first delivery source, and then takes off from the first delivery source and moves (flies) to the delivery destination. On the other hand, in a case where the second delivery method is selected as described above, the delivery control unit 236 transmits a delivery control command including the third position information of the delivery destination and the second position information of the second delivery source to the UAV 1 of the UAV base located at a place different from the second delivery source. As a result, the UAV 1 takes off from the first delivery source without holding the article at the first delivery source and moves to the second delivery source (that is, stops at the second delivery source), holds the article at the second delivery source, and then takes off from the second delivery source and moves to the delivery destination.

Incidentally, in Step S8 shown in FIG. 8, a delivery method may be selected in a process in which the delivery method selection process (Example 1) and the delivery method selection process (Example 2) are combined. In this case, for example, in a case where it is determined in Step S804 that the first predicted delivery time is equal to or shorter than the lead time, the control unit 23 determines whether or not the weight of the designated article is equal to or less than the first held weight upper limit value. In a case where it is determined that the weight of the designated article is equal to or less than the first held weight upper limit value, the control unit 23 selects the first delivery method described above. On the other hand, in a case where it is determined that the weight of the designated article is not equal to or less than the first held weight upper limit value, the control unit 23 executes the processes of Steps S806 to S809 described above. In a case where it is determined in Step S809 that the second predicted delivery time is equal to or shorter than the lead time, the control unit 23 executes the processes of Steps S828 and S829 described above. In a case where it is determined in Step S829 that the weight of the designated article is equal to or less than the second held weight upper limit value, the control unit 23 may perform the processes from Step S810 described above onward and select the second delivery method described above.

Moreover, in a case where a plurality of designated articles are ordered, the delivery schedule may be adjusted as appropriate on the basis of the delivery method selected for each of the designated articles. As a result, the control unit 23 causes the UAV 1 to deliver each of the designated articles to each of the delivery destinations on the basis of the delivery method selected for each of the designated articles. Moreover, in a case where the article with lead time and the article without lead time are ordered as a plurality of designated articles, a delivery method may be changed in accordance with the stock status of the articles. For example, the UAV 1 takes off from a first delivery source and moves to a second delivery source after holding the article without lead time at the first delivery source, and takes off from the second delivery source and moves to a delivery destination after holding the article without lead time at the second delivery source. Alternatively, the UAV 1 may take off from the first delivery source and move to the second delivery source without holding the article without lead time at the first delivery source, and may take off from the second delivery source and move to the delivery destination after holding the article with lead time and the article without lead time at the second delivery source.

As described above, according to the embodiment, the center server 2 selects any of the first delivery method for delivering a designated article handled at the first delivery source to a delivery destination by a same-base UAV 1 and the second delivery method for delivering a designated article handled at the second delivery source to a delivery destination by a different-base UAV 1 on the basis of at least the attribute information of the designated article. Therefore, it is possible to control whether to select a delivery method that places importance on the delivery efficiency of the designated article or to select a delivery method that places importance on the attribute information of the designated article, and it is possible to implement a delivery that is more desirable for the user.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above-described embodiment, even for a specific type of article (for example, frozen food, refrigerated food, and food that is preferably kept warm), a case where the lead time is not set is also considered. Therefore, the control unit 23 may be configured to select the second delivery method described above in a case where it is determined that the article is of the specific type on the basis of the attribute information of the article designated by the user (in this case, it may not be determined whether or not the first predicted delivery time is equal to or shorter than the lead time). This is intended to shorten the delivery time as much as possible in a state where the article is held in the UAV 1 and to maintain the state or quality of the article by selecting the second delivery method. Thus, even if the lead time is not set for the article, the delivery which places importance on the attribute information of the article can also be efficiently implemented. Moreover, in the above-described embodiment, the delivery destination or the delivery area of the article is designated by the user, but the delivery destination or the delivery area of the article may also be predetermined in the system instead of being designated by the user.

Moreover, in the above-described embodiment, the UAV is described as an example of unmanned vehicle, however, the present invention is applicable to a UGV (Unmanned Ground Vehicle) that travels on the ground in an unmanned manner. In this case, the delivery route for calculating the above-described predicted delivery time or the held weight upper limit value is determined on the basis of, for example, the position information of the delivery source, the position information of the delivery destination, and the road on which the UGV can travel. The road on which the UGV can travel may be identified from a map data including the position information of the delivery source and the position information of the delivery destination. Incidentally, in calculating the predicted delivery time or the held weight upper limit value, the scheduled speed of the UGV may be changed in accordance with the traffic condition such as congestion of the road on which the UGV can travel. Moreover, the movement route for calculating the above-described predicted movement time is determined on the basis of, for example, the first position information of the first delivery source, the second position information of the second delivery source, and the road on which the UGV can travel. The road on which the UGV can travel may be identified from a map data including the position information of the delivery source and the position information of the delivery destination. Incidentally, in calculating the predicted movement time, the scheduled speed of the UGV may be changed in accordance with the traffic condition such as congestion of the road on which the UGV can travel.

NOTE

[1] A delivery control device according to the present disclosure includes: a management unit configured to manage first position information of a first delivery source where an article to be delivered is handled and an unmanned vehicle is deployed, and second position information of a second delivery source where the article is handled and no unmanned vehicle is deployed; an acquisition unit configured to acquire attribute information of an article which is designated as a delivery target by a user and third position information of a delivery destination of the article among the articles handled respectively at the first delivery source and the second delivery source; and
a selection unit configured to select, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source. This makes it possible to implement a delivery in which importance is placed on the delivery efficiency of the article or a delivery in which importance is placed on the attribute information of the article in accordance with the designated article.
[2] In the delivery control device described in [1] above, wherein the selection unit selects the first delivery method in a case where the attribute information of the article does not include a time limit for limiting a delivery time in a state where the article is held by the unmanned vehicle. This makes it possible to implement a delivery in which importance is placed on the delivery efficiency of the article in a case where the designated article does not require a limitation of the delivery time.
[3] In the delivery control device described in [1] above, the selection unit selects the second delivery method in a case where it is determined that the article is of a specific type on the basis of the attribute information of the article. This makes it possible to efficiently implement a delivery in which importance is placed on the attribute information of the article even if the time limit for limiting the delivery time is not set for the designated article.
[4] In the delivery control device described in [1] above, in a case where the attribute information of the article includes a time limit for limiting a delivery time in a state where the article is held by the unmanned vehicle, the selection unit calculates a first predicted delivery time required for a delivery of the article from the first delivery source to the delivery destination on the basis of the first position information of the first delivery source and the third position information of the delivery destination, and selects the first delivery method in a case where the calculated first predicted delivery time is equal to or less than the time limit. This makes it possible to implement a delivery in which importance is placed on the delivery efficiency of the article in a case where a risk of quality deterioration is low in accordance with the designated article.
[5] In the delivery control device described in [4] above, in a case where the calculated first predicted delivery time is not equal to or less than the time limit, the selection unit calculates a second predicted delivery time required for a delivery of the article from the second delivery source to the delivery destination on the basis of the second position information of the second delivery source and the third position information of the delivery destination, and selects the second delivery method in a case where the calculated second predicted delivery time is equal to or less than the time limit. This makes it possible to implement a delivery that suppresses quality deterioration of the article in a case where a risk of the quality deterioration is high in accordance with the designated article.
[6] In the delivery control device described in [5] above, the selection unit calculates the second predicted delivery time for each of a plurality of the second delivery sources located at different places, and in a case where a plurality of the second delivery sources having the calculated second predicted delivery time equal to or less than the time limit are identified, the selection unit further calculates a total time of the calculated second predicted delivery time and a predicted movement time of the unmanned vehicle from the base to the second delivery source for each of the identified plurality of the second delivery sources, identifies one of the second delivery sources of which the calculated total time is shortest, and selects the second delivery method for delivering the article handled at the second delivery source which has been identified to the delivery destination. This makes it possible to implement an efficient delivery of the article while suppressing quality deterioration of the designated article.
[7] The delivery control device described in [5] above, further includes a notification unit configured to notify the user, in a case where the calculated second predicted delivery time is not equal to or less than the time limit, of a message indicating that it is difficult to deliver the article which has been designated, prompting the user to re-designate an article, or indicating that a quality of the article may deteriorate due to a delivery of the article which has been designated. This makes it possible for the user who has designated the article to quickly perform a next action.
[8] The delivery control device described in [5] above, further includes a notification unit configured to notify the user, in a case where the selection unit calculates the second predicted delivery times respectively for a plurality of the second delivery sources located at different places and any of the calculated second predicted delivery times is not equal to or less than the time limit, of a message indicating that it is difficult to deliver the article which has been designated, prompting the user to re-designate an article, or indicating that a quality of the article may deteriorate due to a delivery of the article which has been designated. This makes it possible for the user who has designated the article to quickly perform a next action.

[9] In the delivery control device described in any one of [1] to [8] above, the attribute information of the article includes a weight of the article, and the selection unit calculates, on the basis of a vehicle upper limit value set in advance as a weight that can be held by the unmanned vehicle deployed at the first delivery source, the first position information of the first delivery source, and the third position information of the delivery destination, a first upper limit value of a weight that can be held by an unmanned vehicle deployed at the first delivery source in a delivery from the first delivery source to the delivery destination, and selects the first delivery method in a case where the weight of the article is equal to or less than the calculated first upper limit value. This makes it possible to implement a delivery in which importance is placed on the delivery efficiency of the article in a case where a risk of battery exhaustion of the unmanned vehicle is low in accordance with the designated article.

[10] In the delivery control device described in [9] above, in a case where the weight of the article is not equal to or less than the calculated first upper limit value, the selection unit calculates, on the basis of a vehicle upper limit value set in advance as a weight that can be held by the unmanned vehicle deployed at the base, the second position information of the second delivery source, and the third position information of the delivery destination, a second upper limit value of a weight that can be held by an unmanned vehicle deployed at the base in a delivery from the second delivery source to the delivery destination, and selects the second delivery method in a case where the weight of the article is equal to or less than the calculated second upper limit value. This makes it possible to implement a delivery which suppresses battery exhaustion of the unmanned vehicle in a case where a risk of battery exhaustion of the unmanned vehicle is high in accordance with the designated article.

[11] In the delivery control device described in [10] above, the selection unit calculates the second upper limit value for each of a plurality of the second delivery sources located at different places, and in a case where a plurality of the second delivery sources having the weight of the article equal to or less than the calculated second upper limit value are identified, the selection unit identifies one of the second delivery sources of which the calculated second upper limit value is largest among the identified plurality of the second delivery sources, and selects the second delivery method for delivering the article handled at the second delivery source which has been identified to the delivery destination. This makes it possible to appropriately deliver the designated article while suppressing battery exhaustion of the unmanned vehicle.

[12] The delivery control device described in [10] above, further includes a notification unit configured to notify the user, in a case where the weight of the article is not equal to or less than the calculated second upper limit value, of a message indicating that it is difficult to deliver the article which has been designated or prompting the user to re-designate an article. This makes it possible for the user who has designated the article to quickly perform a next action.

[13] In the delivery control device described in any one of [1] to [12] above, the selection unit selects any one delivery method of the first delivery method and the second delivery method on the basis of the attribute information of the article, the first position information of the first delivery source, the second position information of the second delivery source, and the third position information of the delivery destination.

[14] The delivery control device described in any one of [1] to [13] above, further includes: a control unit configured to cause a user terminal to display, on a screen for the user to designate the article, first display information of the first delivery source where the article is handled in preference to second display information of the second delivery source where the article is handled. This makes it possible to further prioritize the delivery that places importance on the delivery efficiency of the article.

[15] The delivery control device described in any one of [1] to [14] above, further includes: a control unit configured to cause the unmanned vehicle to deliver the article which has been designated to the delivery destination on the basis of the selected first delivery method or the selected second delivery method. This makes it possible to perform control to deliver the article to the delivery destination by a more appropriate delivery method in accordance with the designated article.

[16] The delivery control device described in [3], [5], [6] or [11] above, further includes: a control unit configured to cause the unmanned vehicle to move from the base to the second delivery source to hold the article at the second delivery source, and then cause the unmanned vehicle holding the article to deliver the article to the delivery destination, wherein the base is located at the first delivery source. Thus, even when the delivery efficiency is reduced in a case where a risk of quality deterioration of the designated article is high, it is possible to implement a delivery that suppresses the quality deterioration of the article by collecting the article to the delivery source where the quality deterioration of the article is less likely to occur.

[17] A delivery control system according to the present disclosure includes: a management unit configured to manage first position information of a first delivery source where an article to be delivered is handled and an unmanned vehicle is deployed, and second position information of a second delivery source where the article is handled and no unmanned vehicle is deployed; an acquisition unit configured to acquire attribute information of an article which is designated as a delivery target by a user and third position information of a delivery destination of the article among the articles handled respectively at the first delivery source and the second delivery source; and a selection unit configured to select, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source.

[18] A delivery control method according to the present disclosure, is executed by one or more computers. The delivery control method includes: managing first position information of a first delivery source where an article to be delivered is handled and an unmanned vehicle is deployed, and second position information of a second delivery source where the article is handled and no unmanned vehicle is deployed; acquiring attribute information of an article which is designated as a delivery target by a user and third position information of a delivery destination of the article among the articles handled respectively at the first delivery source and the second delivery source; and selecting, on the basis of at least attribute information of the article, any one delivery method of a first delivery method for delivering the article handled at the first delivery source to the delivery destination by the unmanned vehicle and a second delivery method for delivering the article handled at the second delivery source to the delivery destination by an unmanned vehicle deployed at a base located at a place different from the second delivery source, the second delivery source being located closer to the delivery destination than the first delivery source.

REFERENCE SIGNS LIST

1 UAV
2 Center server
3 User terminal
11 Drive unit
12 Positioning unit
13 Communication unit
14 Sensor unit
15 Storage unit
16 Control unit
21 Communication unit
22 Storage unit
23 Control unit
231 Delivery source information management unit
232 Delivery request reception unit
233 Information acquisition unit
234 Delivery method selection unit
235 Message notification unit
236 Delivery control unit
S Delivery control system
NW Communication network

What is claimed is:

1. A delivery control device comprising:
at least one memory configured to store program code; and at least one processor configured to access the program code and operate as instructed by the program code, the program code including:
management code configured to cause the at least one processor to manage first position information of a first delivery source where a first article to be delivered is handled and a first unmanned vehicle is deployed, and second position information of a second delivery source where a second article is handled and no unmanned vehicle is deployed, wherein the first unmanned vehicle is wirelessly connected to a communication network;
acquisition code configured to cause the at least one processor to acquire attribute information of a designated article which is designated as a delivery target by a user and third position information of a delivery destination of the designated article from among a first plurality of articles handled at the first delivery source and a second plurality of articles handled at the second delivery source, wherein the first article and the second article correspond to the designated article;
selection code configured to cause the at least one processor to select, based on the attribute information of the designated article, any one delivery method of a first delivery method for delivering the first article handled at the first delivery source to the delivery destination by the first unmanned vehicle and a second delivery method for delivering the second article handled at the second delivery source to the delivery destination by a second unmanned vehicle deployed at a base located at a place different from the second delivery source, wherein the second delivery source is located closer to the delivery destination than the first delivery source, and wherein the second unmanned vehicle is wirelessly connected to the communication network; and
delivery control code configured to cause the at least one processor to:
control, based on the selected delivery method, via the communication network, one from among:
the first unmanned vehicle to deliver the first article to the delivery destination via a first route based on first radio waves transmitted from satellites of a GNSS (Global Navigation Satellite System), or
the second unmanned vehicle to deliver the second article to the delivery destination via a second route based on second radio waves transmitted from the satellites; and
control, via the communication network, an actuator of the selected unmanned vehicle to, upon delivery, drive a motor to release the delivered article from a holding member of the selected unmanned vehicle,
wherein the attribute information of the designated article includes a weight of the designated article, and
wherein the selection code is configured to cause the at least one processor to:
calculate a first upper limit value of a weight that can be held by a third unmanned vehicle deployed at the first delivery source in a first delivery from the first delivery source to the delivery destination, based on:
a vehicle upper limit value set in advance as a weight that can be held by the first unmanned vehicle deployed at the first delivery source,
the first position information of the first delivery source,
the third position information of the delivery destination, and
a determined speed of the third unmanned vehicle based on a determined route to the delivery destination from among the first route and the second route; and
select the first delivery method based on the weight of the designated article being equal to or less than the first upper limit value.

2. The delivery control device according to claim 1, wherein the selection code is configured to cause the at least one processor to select the first delivery method based on the attribute information of the designated article not including a time limit for limiting a delivery time in a state where a corresponding article is held by a corresponding unmanned vehicle.

3. The delivery control device according to claim 1, wherein the selection code is configured to cause the at least one processor to select the second delivery method based on determining that the designated article is of a specific type, wherein the specific type is determined based on the attribute information.

4. The delivery control device according to claim 3, wherein the delivery control code is configured to cause the at least one processor to control the second unmanned vehicle to move from the base to the second delivery source to hold the second article at the second delivery source, and then to control the second unmanned vehicle holding the second article to deliver the second article to the delivery destination, wherein the base is located at the first delivery source.

5. The delivery control device according to claim 1, wherein the selection code is configured to cause the at least one processor to, based on the attribute information including a time limit for limiting a delivery time in a state where a corresponding article is held by a corresponding unmanned vehicle:

calculate a first predicted delivery time required for delivery of the first article from the first delivery source to the delivery destination based on the first position information of the first delivery source and the third position information of the delivery destination, and select the first delivery method based on the first predicted delivery time being equal to or less than the time limit.

6. The delivery control device according to claim 5, wherein the selection code is configured to cause the at least one processor to, based on the first predicted delivery time not being greater than the time limit:

calculate a second predicted delivery time required for delivery of the second article from the second delivery source to the delivery destination based on the second position information of the second delivery source and the third position information of the delivery destination, and select the second delivery method based on the second predicted delivery time being equal to or less than the time limit.

7. The delivery control device according to claim 6, wherein the selection code is configured to cause the at least one processor to:

calculate a plurality of second predicted delivery times for a plurality of second delivery sources located at different places, and based on two or more second delivery sources from among the plurality of second delivery sources having a calculated third predicted delivery time equal to or less than the time limit being identified:

further calculate a total time of the third predicted delivery time and a predicted movement time of the second unmanned vehicle from the base to the second delivery source for each of the two or more second delivery sources, to identify a third delivery source of which the total time is shortest, and select the second delivery method for delivering, to the delivery destination, a third article handled at the third delivery source which has been identified, wherein the third article corresponds to the designated article.

8. The delivery control device according to claim 6, the program code further including notification code configured to cause the at least one processor to notify the user, based on the second predicted delivery time being greater than the time limit, via a message indicating difficulty in delivering the second article, prompting the user to select a re-designated article, or indicating that a quality of the second article may deteriorate due to delivery of the second article.

9. The delivery control device according to claim 6, the program code further including notification code configured to cause the at least one processor to notify the user, in a case where the selection code causes the at least one processor to:

calculate a plurality of second predicted delivery times for a plurality of second delivery sources located at different places; and based on any of the plurality of second predicted delivery times being greater than the time limit:

notify the user via a first message transmitted to a user terminal indicating difficulty in delivering the second article, and prompt the user to select a re-designated article, or indicate via a second message transmitted to the user terminal that a quality of the second article may deteriorate due to delivery of the second article.

10. The delivery control device according to claim 1, wherein the selection code is configured to cause the at least one processor to:

based on the weight of the designated article being greater than the first upper limit value, calculate a second upper limit value of a weight that can be held by a fourth unmanned vehicle deployed at the base in a second delivery from the second delivery source to the delivery destination, based on:

a vehicle upper limit value set in advance as a weight that can be held by the second unmanned vehicle deployed at the base, the second position information of the second delivery source, and the third position information of the delivery destination; and select the second delivery method based on the weight of the designated article being equal to or less than the second upper limit value.

11. The delivery control device according to claim 10, wherein the selection code is configured to cause the at least one processor to:

calculate the second upper limit value for each of a plurality of second delivery sources located at different places; and based on two or more of the plurality of second delivery sources having the weight of the designated article equal to or less than the second upper limit value being identified;

identify one of the two or more second delivery sources of which the second upper limit value is largest among the plurality of second delivery sources, and select the second delivery method for delivering, to the delivery destination, a third article corresponding to the designated article that is handled at the identified second delivery source.

12. The delivery control device according to claim 10, the program code further including notification code configured to cause the at least one processor to notify the user, based on the weight of the designated article being greater than the second upper limit value, via a message indicating that it is difficult to deliver a corresponding article or prompting the user to select a re-designated article.

13. The delivery control device according to claim 1, wherein the selection code is configured to cause the at least one processor to select any one delivery method of the first delivery method and the second delivery method based on the attribute information of the designated article, the first position information of the first delivery source, the second position information of the second delivery source, and the third position information of the delivery destination.

14. The delivery control device according to claim 1, wherein the delivery control code is configured to cause the at least one processor to transmit information to a user terminal to cause the user terminal to display, on a screen for the user to select the designated article, first display information of the first delivery source where the first article is handled in preference to second display information of the second delivery source where the second article is handled.

15. A delivery control system comprising:
at least one memory configured to store program code; and at least one processor configured to access the program code and operate as instructed by the program code, the program code including:
management code configured to cause the at least one processor to manage first position information of a first delivery source where a first article to be delivered is handled and a first unmanned vehicle is deployed, and second position information of a second delivery source where a second article is handled and no unmanned vehicle is deployed, wherein the first unmanned vehicle is wirelessly connected to a communication network;
acquisition code configured to cause the at least one processor to acquire attribute information of a designated article which is designated as a delivery target by a user and third position information of a delivery destination of the designated article from among a first plurality of articles handled at the first delivery source and a second plurality of articles handled at the second delivery source, wherein the first article and the second article correspond to the designated article; and
selection code configured to cause the at least one processor to select, based on the attribute information of the designated article, any one delivery method of a first delivery method for delivering the first article handled at the first delivery source to the delivery destination by the first unmanned vehicle and a second delivery method for delivering the second article handled at the second delivery source to the delivery destination by a second unmanned vehicle deployed at a base located at a place different from the second delivery source, wherein the second delivery source is located closer to the delivery destination than the first delivery source, and wherein the second unmanned vehicle is wirelessly connected to the communication network; and
delivery control code configured to cause the at least one processor to:
control, based on the selected delivery method, via the communication network, one from among:
the first unmanned vehicle to deliver the first article to the delivery destination via a first route based on first radio waves transmitted from satellites of a GNSS (Global Navigation Satellite System), or
the second unmanned vehicle to deliver the second article to the delivery destination via a second route based on second radio waves transmitted from the satellites; and
control, via the communication network, an actuator of the selected unmanned vehicle to, upon delivery, drive a motor to release the delivered article from a holding member of the selected unmanned vehicle,
wherein the attribute information of the designated article includes a weight of the designated article, and
wherein the selection code is configured to cause the at least one processor to:
calculate a first upper limit value of a weight that can be held by a third unmanned vehicle deployed at the first delivery source in a first delivery from the first delivery source to the delivery destination, based on:
a vehicle upper limit value set in advance as a weight that can be held by the first unmanned vehicle deployed at the first delivery source,
the first position information of the first delivery source,
the third position information of the delivery destination, and
a determined speed of the third unmanned vehicle based on a determined route to the delivery destination from among the first route and the second route; and
select the first delivery method based on the weight of the designated article being equal to or less than the first upper limit value.

16. A delivery control method executed by one or more computers, comprising:
managing first position information of a first delivery source where a first article to be delivered is handled and a first unmanned vehicle is deployed, and second position information of a second delivery source where a second article is handled and no unmanned vehicle is deployed, wherein the first unmanned vehicle is wirelessly connected to a communication network;
acquiring an attribute information of a designated article which is designated as a delivery target by a user and third position information of a delivery destination of the designated article from among a first plurality of articles handled at the first delivery source and a second plurality of articles handled at the second delivery source; and
selecting, based on the attribute information of the designated article, any one delivery method of a first delivery method for delivering the first article handled at the first delivery source to the delivery destination by the first unmanned vehicle and a second delivery method for delivering the second article handled at the second delivery source to the delivery destination by a second unmanned vehicle deployed at a base located at a place different from the second delivery source, wherein the second delivery source is located closer to the delivery destination than the first delivery source, and wherein the second unmanned vehicle is wirelessly connected to the communication network;
controlling, based on the selected delivery method, via the communication network, one from among:
the first unmanned vehicle to deliver the first article to the delivery destination via a first route based on first radio waves transmitted from satellites of a GNSS (Global Navigation Satellite System), or
the second unmanned vehicle to deliver the second article to the delivery destination via a second route based on second radio waves transmitted from the satellites; and
controlling, via the communication network, an actuator of the selected unmanned vehicle to, upon delivery, drive a motor and release the delivered article from a holding member of the selected unmanned vehicle,
wherein the attribute information of the designated article includes a weight of the designated article, and wherein selecting the designated article further comprises:
  calculating a first upper limit value of a weight that can be held by a third unmanned vehicle deployed at the first delivery source in a first delivery from the first delivery source to the delivery destination, based on:
    a vehicle upper limit value set in advance as a weight that can be held by the first unmanned vehicle deployed at the first delivery source,
    the first position information of the first delivery source,
    the third position information of the delivery destination, and
    a determined speed of the third unmanned vehicle based on a determined route to the delivery destination from among the first route and the second route; and
  selecting the first delivery method based on the weight of the designated article being equal to or less than the first upper limit value.

* * * * *